(12) United States Patent
Dayan et al.

(10) Patent No.: US 12,583,623 B1
(45) Date of Patent: Mar. 24, 2026

(54) GROUND STATION WITH AUTONOMOUS BATTERY SWAPPING DEVICE

(71) Applicant: Starling, Inc., San Diego, CA (US)

(72) Inventors: Omri Dayan, San Diego, CA (US);
Noy Kahalani, San Diego, CA (US);
Kavin Gustafson, San Diego, CA (US);
Ido Gur, San Diego, CA (US)

(73) Assignee: Starling, Inc., San Diego, CA (US)

( * ) Notice: Subject to any disclaimer, the term of this patent is extended or adjusted under 35 U.S.C. 154(b) by 0 days.

(21) Appl. No.: 19/074,982

(22) Filed: Mar. 10, 2025

(51) Int. Cl.
B60L 53/80 (2019.01)
B64F 1/35 (2024.01)
B64U 70/90 (2023.01)
H01M 50/249 (2021.01)

(52) U.S. Cl.
CPC .............. B64F 1/35 (2024.01); B60L 53/80 (2019.02); B64U 70/90 (2023.01); H01M 50/249 (2021.01); *B60L 2200/10* (2013.01); *H01M 2220/20* (2013.01)

(58) Field of Classification Search
CPC ...... B60L 53/00; B60L 53/80; B60L 2200/10; B64F 1/12; B64F 1/35; B64F 1/352; B64F 50/37; B64F 50/38; B64F 70/00; B64F 70/50; B64F 70/90; B64F 70/92; B64F 70/93; B64F 70/95; B64F 70/97; B64F 70/99; B64F 80/00; B64F 80/10; B64F 80/20; B64F 80/25; B64F 80/70; B64F 80/80; B64F 80/82; B64F 80/84; B64F 80/86; H01M 50/249; H01M 2220/20

USPC ........................................................ 244/114 R
See application file for complete search history.

(56) References Cited

U.S. PATENT DOCUMENTS

| | | | | |
|---|---|---|---|---|
| 9,139,310 B1 * | 9/2015 | Wang | ..................... | G05D 1/102 |
| 10,414,517 B2 * | 9/2019 | Wang | ..................... | B64U 70/97 |
| 10,913,546 B2 * | 2/2021 | Krauss | ..................... | B64F 1/18 |
| 11,866,168 B2 * | 1/2024 | Cooper | ................. | B64U 70/97 |
| 12,286,252 B2 * | 4/2025 | Kim | ..................... | B64U 70/99 |
| 2016/0039300 A1 * | 2/2016 | Wang | ..................... | B60L 53/80 244/58 |
| 2017/0129464 A1 * | 5/2017 | Wang | ..................... | H02J 7/0045 |
| 2019/0315235 A1 * | 10/2019 | Kung | ..................... | B60L 53/36 |
| 2021/0276735 A1 * | 9/2021 | Raptopoulos | ........ | A47G 29/141 |
| 2021/0284335 A1 * | 9/2021 | Mclaughlin | ............ | B64U 50/39 |
| 2022/0234757 A1 * | 7/2022 | Dayan | ................... | B64U 70/97 |
| 2023/0082712 A1 * | 3/2023 | Pawelczyk | ............. | B64F 1/222 244/114 R |
| 2023/0166865 A1 * | 6/2023 | Borko | ................... | B64U 70/30 244/114 R |
| 2024/0384587 A1 * | 11/2024 | Anderson | ............. | B64U 70/90 |

(Continued)

FOREIGN PATENT DOCUMENTS

| | | | | | |
|---|---|---|---|---|---|
| CN | 110937127 A | * | 3/2020 | ............. | B60L 53/80 |
| CN | 112977863 A | * | 6/2021 | ............. | B60L 53/80 |

(Continued)

*Primary Examiner* — Joshua E Rodden
(74) *Attorney, Agent, or Firm* — Carter, DeLuca & Farrel

(57) ABSTRACT

A ground station of a UAS for an unmanned aerial vehicle (UAV) includes a landing pad assembly and a carousel assembly that allow for passive removal and replacement of a battery from and to a UAV. The UAS can include a battery replacement system that uses the mechanical movement of a landing pad of the ground station to control movement of a battery door of the landing pad assembly.

19 Claims, 22 Drawing Sheets

(56)     References Cited

U.S. PATENT DOCUMENTS

2024/0391616 A1 * 11/2024  Dayan ..................... B64U 70/90
2025/0026509 A1 *  1/2025  Infanti ................... B64U 70/50

FOREIGN PATENT DOCUMENTS

CN      113859046 A  * 12/2021   ............. B64U 80/86
KR        2176777 B1 * 12/2020   ............. B60L 53/80

* cited by examiner

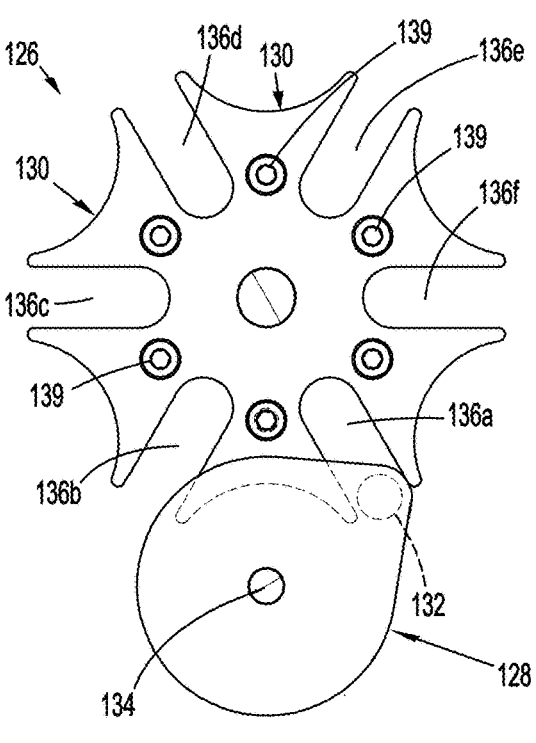
FIG. 13
FIG. 14
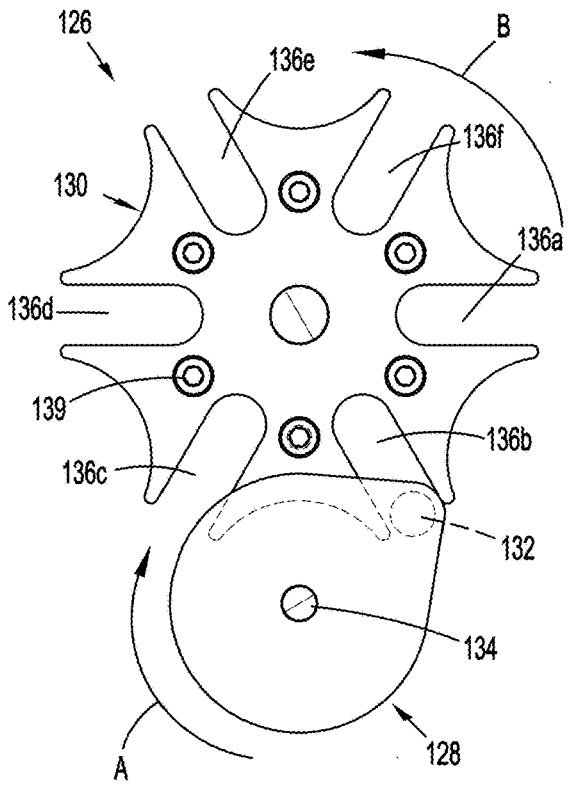
FIG. 15
FIG. 16

GROUND STATION WITH AUTONOMOUS BATTERY SWAPPING DEVICE

TECHNICAL FIELD

This disclosure relates to operable ground stations for an unmanned aerial system (UAS), and more particularly to a UAS with passive battery swapping capabilities.

BACKGROUND

UAS are used for a variety of purposes including surveillance and reconnaissance for military and civilian applications. In some instances, the UAS includes a unmanned aerial vehicle (UAV) that is powered by an onboard rechargeable battery and a ground station capable of housing and controlling the UAV. In applications that require increased range or flight time of the UAV, the ground station may include automatic recharging after landing or battery replacement capabilities. A ground station having battery replacement capabilities that allows for autonomous battery replacement in a simplified and more reliable manner is desirable. Current UAS ground stations with robotic battery swapping capabilities use robotic arms or gantries to extract and replace the UAV battery.

BRIEF DESCRIPTION OF THE DRAWINGS

A better understanding of the features and advantages of the disclosed technology will be obtained by reference to the following detailed description that sets forth illustrative aspects, in which the principles of the technology are utilized, and the accompanying figures of which:

FIG. 13 is an end view of a drive mechanism of the battery carousel assembly shown in FIG. 12 with the battery carousel assembly in a first position;

FIG. 14 is an end view of the drive mechanism of the battery carousel assembly shown in FIG. 12 with the battery carousel assembly in a second position;

FIG. 15 is an end view of the drive mechanism of the battery carousel assembly shown in FIG. 12 with the battery carousel assembly in a third position;

FIG. 16 is an end view of the drive mechanism of the battery carousel assembly shown in FIG. 12 with the battery carousel assembly in a first position;

Figure 1:
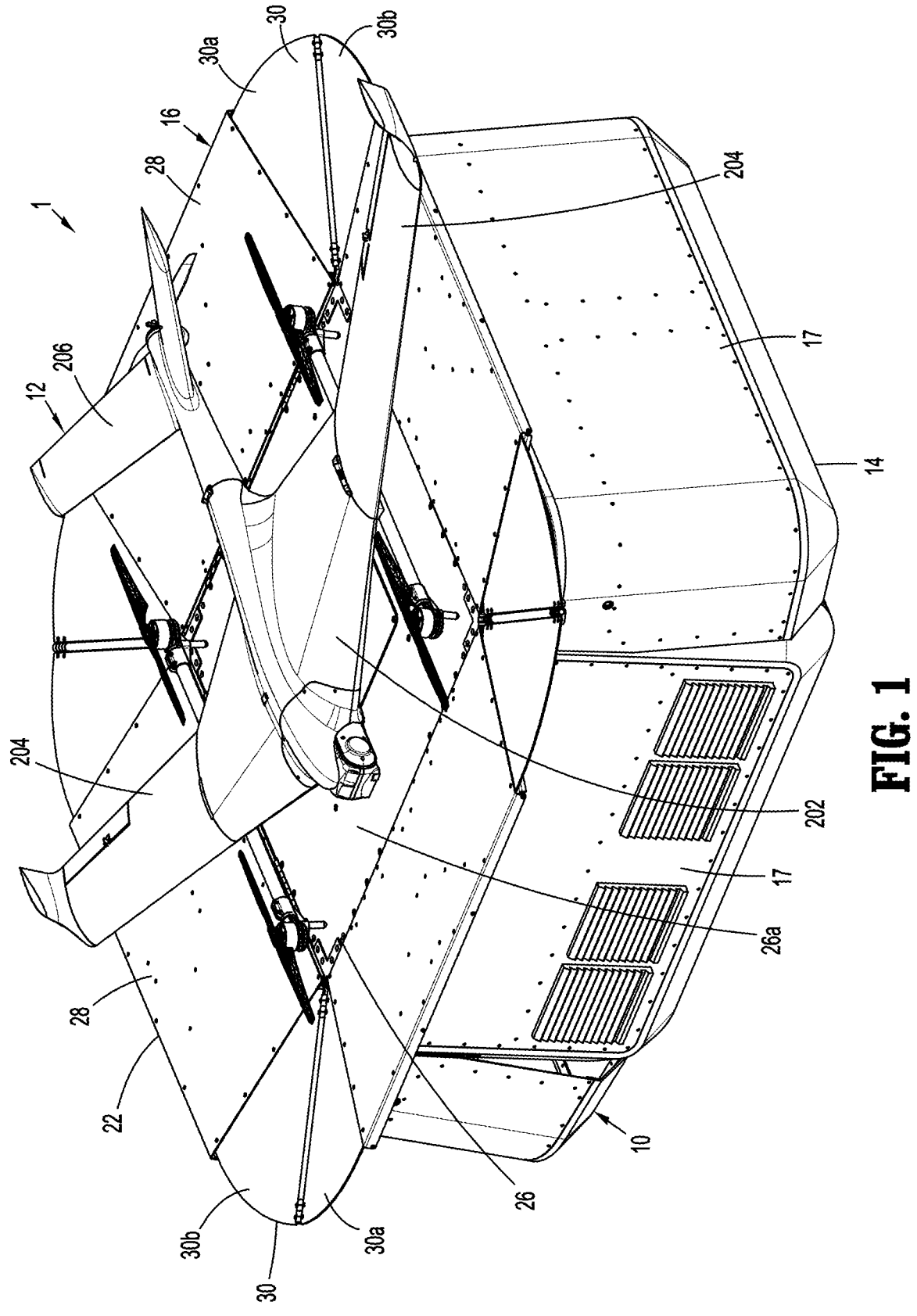
FIG. 1 is a side perspective view of a UAS in accordance with the principles of this disclosure with a ground station in the deployed position and a UAV supported on the ground station.
Figure 2:
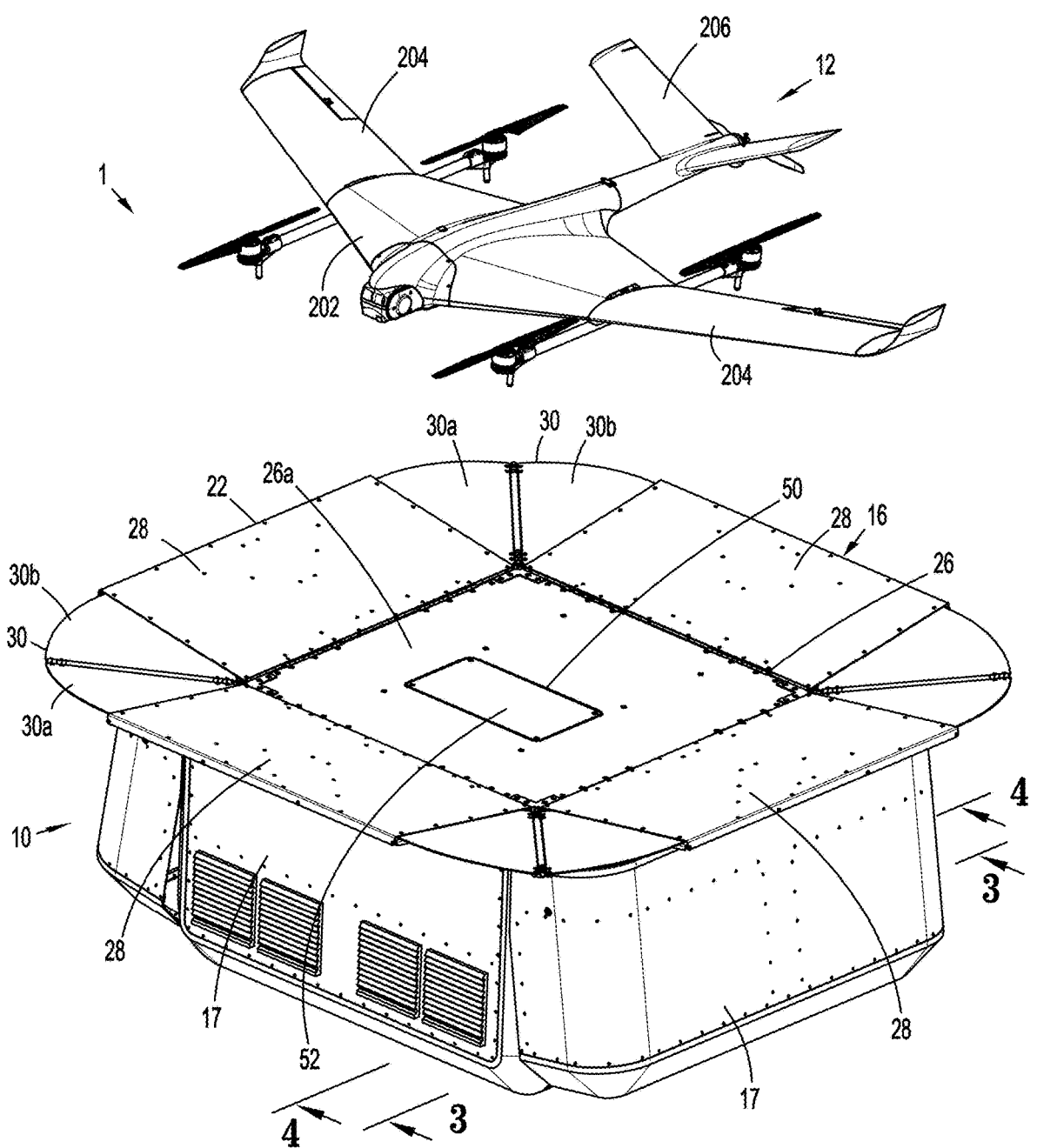
FIG. 2 is a side perspective view of the UAS of FIG. 1 with the ground station in the deployed position and the UAV positioned above the ground station.

Further details and exemplary aspects of the disclosure are described in more detail below with reference to the appended figures. Any of the above aspects of the disclosure may be combined without departing from the scope of the disclosure.

DETAILED DESCRIPTION

Although illustrative systems of this disclosure will be described in terms of specific aspects, it will be readily apparent to those skilled in this art that various modifications, rearrangements, and substitutions may be made without departing from the spirit of this disclosure.

For purposes of promoting an understanding of the principles of this disclosure, reference will now be made to exemplary aspects illustrated in the figures, and specific language will be used to describe the same. It will nevertheless be understood that no limitation of the scope of this disclosure is thereby intended. Any alterations and further modifications of this disclosure features illustrated herein, and any additional applications of the principles of this disclosure as illustrated herein, which would occur to one skilled in the relevant art and having possession of this disclosure, are to be considered within the scope of this disclosure.

In the following description, well-known functions or constructions are not described in detail to avoid obscuring the disclosure in unnecessary detail.

Aspects of this disclosure are directed at a UAS having a ground station including a landing pad assembly. The landing pad assembly of the disclosed ground station is configured to center the UAV automatically and passively upon closing the ground station. The ground station can be rugged, military grade, and ultra-portable. In some aspects of this disclosure, the size of the ground station may be only slightly larger than the UAV that the ground station houses. These characteristics enable the integration of a drone-in-a-box platform into medium and large unmanned ground vehicles, as well as small manned vehicles, which have limited space.

Generally, this disclosure is directed to a UAS that includes a ground station having a battery replacement system that uses the mechanical movement of a landing pad of the ground station to facilitate battery replacement without the need for additional drive units. More specifically, this disclosure is directed to a ground station having a battery replacement system that is driven by movement of the landing pad to provide access to the battery of a UAV and facilitate battery replacement.

FIGS. 1-7 illustrate the disclosed UAS shown generally as system 1 which includes a ground station 10 and a UAV 12. The ground station 10 includes a box assembly 14, and a landing pad assembly 16 that is movable between a stowed position supported within the box assembly 14 and an open or deployed position located atop the box assembly 14.

The box assembly 14 of ground station 10 includes outer panels 17 and a frame assembly 18 (FIG. 3) that supports the outer panels 17. The frame assembly 18 defines an upper opening 20 (FIG. 5) of the box assembly 14 that is dimensioned to facilitate passage of the landing pad assembly 16 into the frame assembly 18 as the landing pad assembly 16 moves between the stowed position and the deployed position. Although the box assembly 14 is illustrated as having a square configuration, other configurations are envisioned. It is also envisioned that a hatch assembly (not shown) can be provided to close the opening 20 when the UAV 12 is in the stowed position.

The landing pad assembly 16 includes a landing pad 22 and an actuator assembly 24 (FIG. 3) that is engaged with the landing pad 22 and is operable to move the landing pad 22 between the stowed position and the deployed position. The landing pad 22 includes a center pad 26, side pads 28, and corner panels 30. The center pad 26 has a shape that corresponds to the shape of the upper opening 20 of the frame assembly 18 and has an outer surface 26a that defines a substantially horizontal plane when the ground station 10 is positioned on a horizontal support surface. In aspects of the disclosure, the center pad 26 has a square configuration and is dimensioned to be received within the upper opening 20 of the frame assembly 18. Other pad configurations are envisioned.

The side pads 28 are pivotably connected to the center pad 26 with hinges or the like and extend outwardly from sides of the center pad 26 when the landing pad assembly 16 is in the deployed position. In aspects of the disclosure, the side pads 28 are angled slightly upwardly in a direction away from the center pad 26 when the landing pad assembly 16 is in the deployed position. When the landing pad assembly 16 is moved from the deployed position towards the stowed position, the side pads 28 engage the frame assembly 18 and pivot upwardly to a substantially vertical orientation, substantially perpendicular to the horizontal plane defined by the center pad 26. In the stowed position, the landing pad assembly 16 is received within the frame assembly 18 of the box assembly 14.

The corner panels 30 are secured to opposite ends of the side pads 28 and are movable to a position behind or within the side pads 28 when the landing pad assembly 16 is in the stowed position. The corner panels 30 are positioned between adjacent side panels 28 and fill the space between the adjacent side panels 28 when the landing pad assembly 16 is in the deployed position. In aspects of the disclosure, the corner panels 30 are formed from two half-sections 30a, 30b that are pivotably coupled to each other. Each of the half-sections 30a, 30b is movable behind or within one of the adjacent side panels 28 when the landing pad assembly 16 is moved to the stowed position within the frame assembly 18 of the box assembly 14. It is envisioned that the corner panels 30 could have a variety of configurations not described herein.

Figure 3:
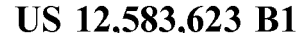
FIG. 3 is a side perspective view in the direction of arrows 3 of the ground station shown in FIG. 2 in the deployed position with an outer panel of the ground station removed.

FIG. 3 illustrates the actuator assembly 24 that moves the center pad 26 between a raised position that corresponds to the deployed position of the landing pad assembly 16 and a lowered position that corresponds to the stowed position of the landing pad assembly 16. In aspects of the disclosure, the actuator assembly 24 includes first and second arm members 34 and 36, a driver 38, and a motor 40. The first and second arm members 34 and 36 are pivotably coupled to each other in scissor-like fashion by a pivot member 42 and have an X-shaped configuration in the raised position of the center pad 26. The first arm member 34 includes an upper end that is pivotably coupled to a bracket 44 that is fixedly coupled to the bottom of the central pad 26, and a lower end that is secured to a bracket 46 that is slidably secured to the frame assembly 18 in a lower portion of the box assembly 14. The second arm member 36 includes an upper end that is pivotably coupled to a bracket 47 that is slidably coupled to the bottom of the center pad 26, and a lower end that is pivotably coupled to a bracket 49 that is fixedly coupled to the frame assembly 18 of the box assembly 14. In aspects of the disclosure, guide rails 48 are secured to the bottom of the center pad 26 and the frame assembly 18 to slidably support the brackets 46 and 47. Although only one actuator assembly 24 is shown, it is envisioned that the box assembly 14 can include two or more actuator assemblies 24 operatively engaged with the center pad 26.

The motor 40 is fixedly secured to the bracket 49 and is coupled to a first end of the driver 38. The motor 40 can be actuated to move the driver 38 between a retracted position and an advanced position. In aspects of the disclosure, the motor 40 is an electric motor although other motor types are envisioned, e.g., hydraulic or pneumatic. The driver 38 has a second end that is secured to the bracket 46. When the driver 38 is moved from the retracted position towards the advanced position, the bracket 46 is advanced along the bottom of the box assembly 14 to move the first arm member 36 and the second arm member 38 towards a more parallel or collapsed configuration to move the center pad 26 towards the lowered position.

The center pad 26 defines a window 50 (FIG. 2) that can be centrally located on the landing pad 22. The window 50 is closed by a battery door 52 positioned within the window 50 when the landing pad assembly 16 is in the deployed position. The battery door 52 is moved between a closed position and an open position by a battery door mechanism 60 that is coupled to the center pad 26 of the landing pad assembly 16. The battery door mechanism 60 forms part of a battery replacement system of the ground station 10.

Figure 4:
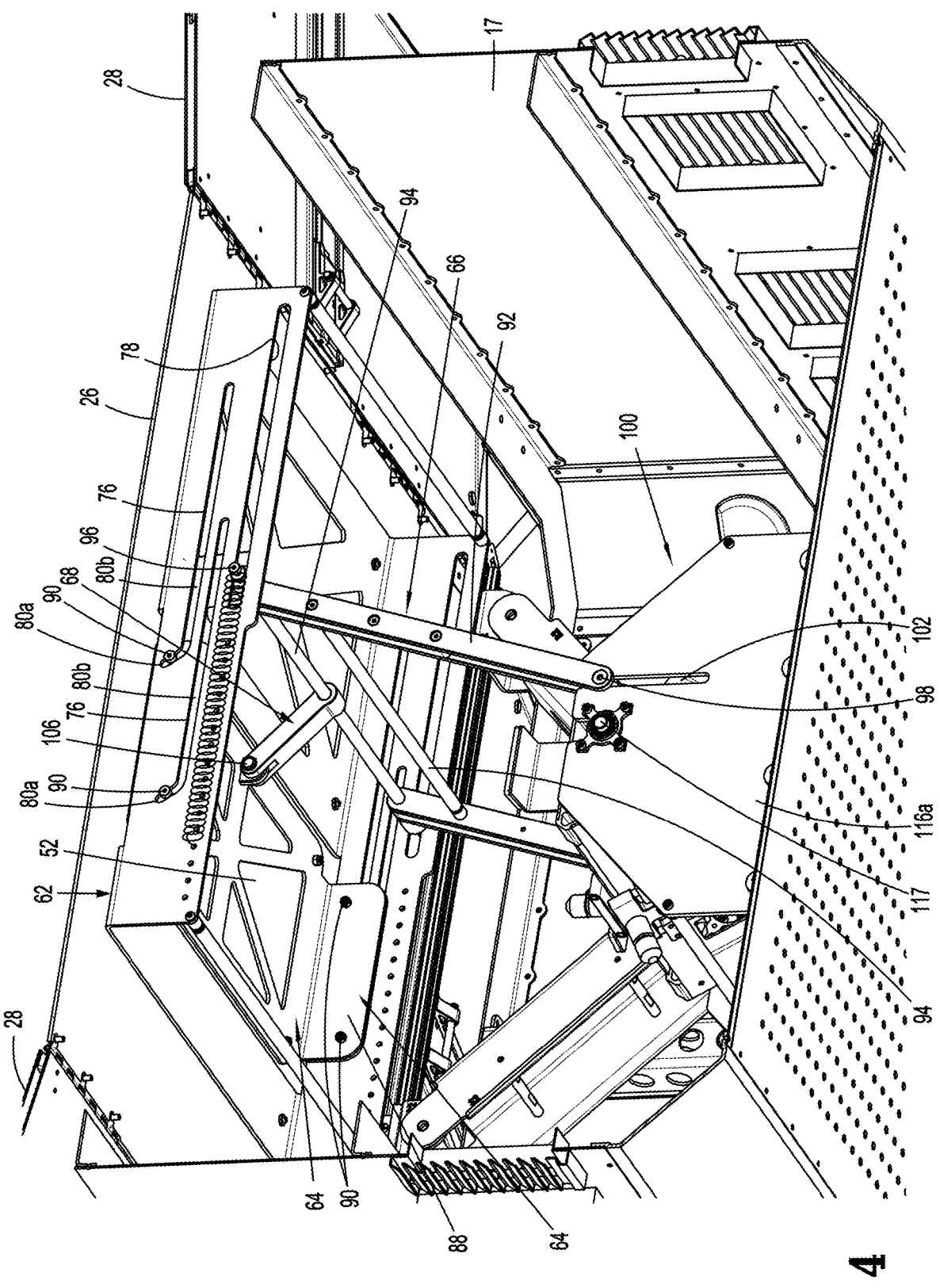
FIG. 4 is an exploded, perspective view in the direction of arrows 4 of a battery door mechanism and landing pad of the ground station shown in FIG. 3.
Figure 5:
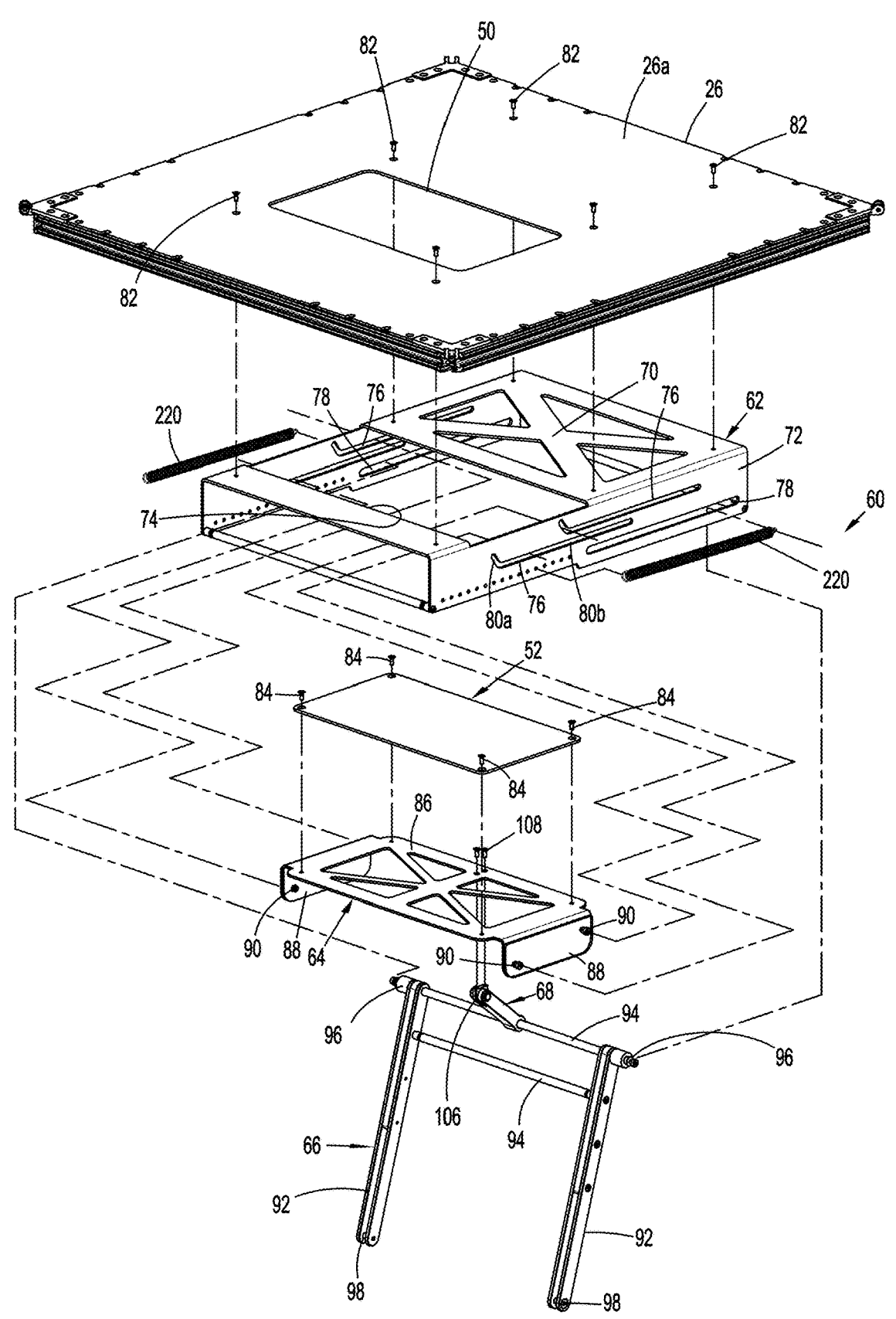
FIG. 5 is a side, perspective view of the ground station shown in FIG. 3 in a deployed position with the outer panel of the ground station removed and the battery door mechanism in the closed position.

FIGS. 3-5 illustrate the battery door mechanism 60 according to aspects of the disclosure. It is envisioned that other mechanisms can be incorporated into the system 1 to control operation of the battery door 52. These mechanisms can be operated independently of, or in association with, the landing pad assembly 16.

In aspects of the disclosure, the battery door mechanism 60 includes a landing pad support 62, a door support 64, the battery door 52, a rack or coupler 66, and a battery door link 68. The landing pad support 62 is secured to the bottom surface of the center pad 26 of the landing pad 22 and includes an upper wall 70 and side walls 72. The upper wall 70 defines an opening 74 that is aligned with the window 50 formed in the center pad 26 of the landing pad 22. Each of the side walls 72 of the landing pad support 62 defines a pair of vertically spaced door cam slots 76 and a rack cam slot 78. Each of the door cam slots 76 has a downwardly angled portion 80a that communicates with a horizontal portion 80b of the door cam slot 76, and the rack cam slot 78 is a horizontal slot along its length. In aspects of the disclosure, the landing pad support 62 is secured to the bottom of the center pad 26 of the landing pad 22 with screws 82, e.g., six screws, although the use of other attachment devices is envisioned.

The battery door 52 is secured to the door support 64 using, e.g., screws 84 although the use of other attachment devices is envisioned. In some aspects of the disclosure, the outer surface of the battery door 52 is substantially flush with the outer surface 26a of the center pad 26 when the battery door is in a closed position. The door support 64 includes a top wall 86 that supports the battery door 52 and end walls 88 that extend downwardly from the top wall 86. Each of the end walls 88 of the door support 64 supports a pair of cam members, e.g., pins 90, that are vertically offset and axially spaced from each other and are received within each of the door cam slots 76 on each side of the landing pad support 62 to support the battery door 52 in a horizontal orientation within the window 50 of the center pad 26 of the landing pad 22. As described in further detail below, the pins 90 are movable within the angled portion 80a of the door cam slots 76 to initially lower the battery door 52 within the window 50 of the center pad 26 of the landing pad 22, and subsequently movable within the horizontal portion 80b of the door cam slots 76 to move the battery door 52 horizontally from beneath the window 50.

In some aspects of the disclosure, the rack or coupler 66 includes spaced legs 92 that are coupled together with one or more cross beams 94. The cross beams 94 are positioned between an upper portion of the spaced legs 92 to fixedly secure the spaced legs 92 in relation to each other. The upper portion of the rack 66 supports two cam members 96 that are received within the rack cam slots 78 formed in the side walls 78 of the landing pad support 62, and the lower portion of the rack 66 supports guide pins 98 that are received within timing slots 102 (FIG. 4) of a battery carousel assembly 100 described in further detail below.

The battery door link 68 includes a first end portion that is secured to the bottom of the door support 64 and a second end portion that is pivotably coupled to the cross beam 94. In aspects of the disclosure, the battery door link 68 includes a rotatable coupling 106 that is secured to the bottom of the door support 64 with screws 108 although the use of other attachment devices is envisioned.

FIGS. 8-16 illustrate the battery carousel assembly 100 according to aspects of the disclosure which is embedded in the ground station 10 and forms part of the battery replacement system of the ground station 10. The battery carousel system 100 includes a carousel 110, a carousel support structure 112, and a carousel motor 114. The carousel 110 is illustrated as a rotatable body. However, as used herein, the carousel 110 is defined as any structure that can support two or more batteries and is movable to selectively position either battery beneath the window of the landing pad 22.

In aspects of the disclosure, the carousel support structure 112 includes first and second spaced end plates 116a and 116b and cross bars 118 that extend between the first and second end plates 116a and 116b to secure the first and second end plates 116a and 116b to each other. In some aspects of the disclosure, the first and second end plates 116a and 116b define the timing slots 102 and the second end plate 116b supports the motor 114 in a position beneath the carousel 110. It is envisioned that the timing slots 102 can be formed on other portions of the ground station 10. The motor 114 is coupled to a drive pulley 120 that drives a belt 122 (FIG. 10) that is coupled to a driven pulley 124. The carousel 110 is rotatably supported on a carousel shaft 117 that extends between the first and second end plates 116a and 116b. Each end of the carousel shaft 117 can be supported in a bearing 117a supported on the first and second end plates 116a and 116b.

In aspects of the disclosure, the driven pulley 124 is coupled to the carousel 110 by a Geneva mechanism 126 (FIG. 13) for precisely controlling rotation of the carousel 110. The Geneva mechanism 126 includes a disk 128 and a Geneva wheel 130. The disk 128 may have an eccentric configuration, e.g., tear-drop shape, and supports a pin 132 (FIG. 13). The disk 128 includes a shaft 134 (FIG. 11) that is coupled to the driven pulley 124 and is rotatably supported on the second end plate 116b of the carousel support structure 112. In some aspects of the disclosure, the Geneva wheel 130 is fixedly secured to the carousel 110 and defines a plurality of radial slots 136 that are spaced evenly around the Geneva wheel 130 and positioned to receive the pin 132 of the disk 128 as the disk 128 is rotated by the driven pulley 124 to rotate the Geneva wheel 130 and the carousel 110. In aspects of the disclosure, the Geneva wheel 130 is secured to the carousel 110 with screws 139 (FIG. 11) although the use of other attachment devices is envisioned.

In aspects of the disclosure, the carousel 110 is configured to receive three batteries 140, 142, and 144 (FIG. 25) and the plurality of radial slots 136 formed in the Geneva wheel 130 includes six slots 136a-f that are spaced sixty degrees apart from each other. When the disk 128 is rotated by the motor 114 in the direction indicated by arrow "A" in FIG. 14 from the position shown in FIG. 13, the pin 132 of the disk 128 is rotated from slot 136a and is received within the slot 136b. Once the pin 132 is received within slot 136b of the Geneva wheel 130, continued rotation of the disk 128 causes rotation of the Geneva wheel 130 in the direction of arrow "B" in FIG. 15 over a 60-degree arc. When the pin 132 of the disk 128 reaches the position shown in FIG. 15, the pin 132 exits the slot 132*b* and the disk 128 rotates independently of the Geneva wheel 130 until the pin 132 enters into the slot 136*c* (FIG. 16) to rotate the Geneva wheel over another 60-degree are such that the Geneva wheel 130 and the carousel 110 are rotated a total of 120-degree arc.

It is envisioned that the motor 114 can be coupled to the carousel 110 using a variety of different mechanisms, gears, or the like without the use of a Geneva mechanism 126. For example, a motor having an encoder, or a stepper motor type mechanism can be coupled to the carousel 110 to provide precise movement of the carousel 110 between different carousel positions described below.

Figure 11:
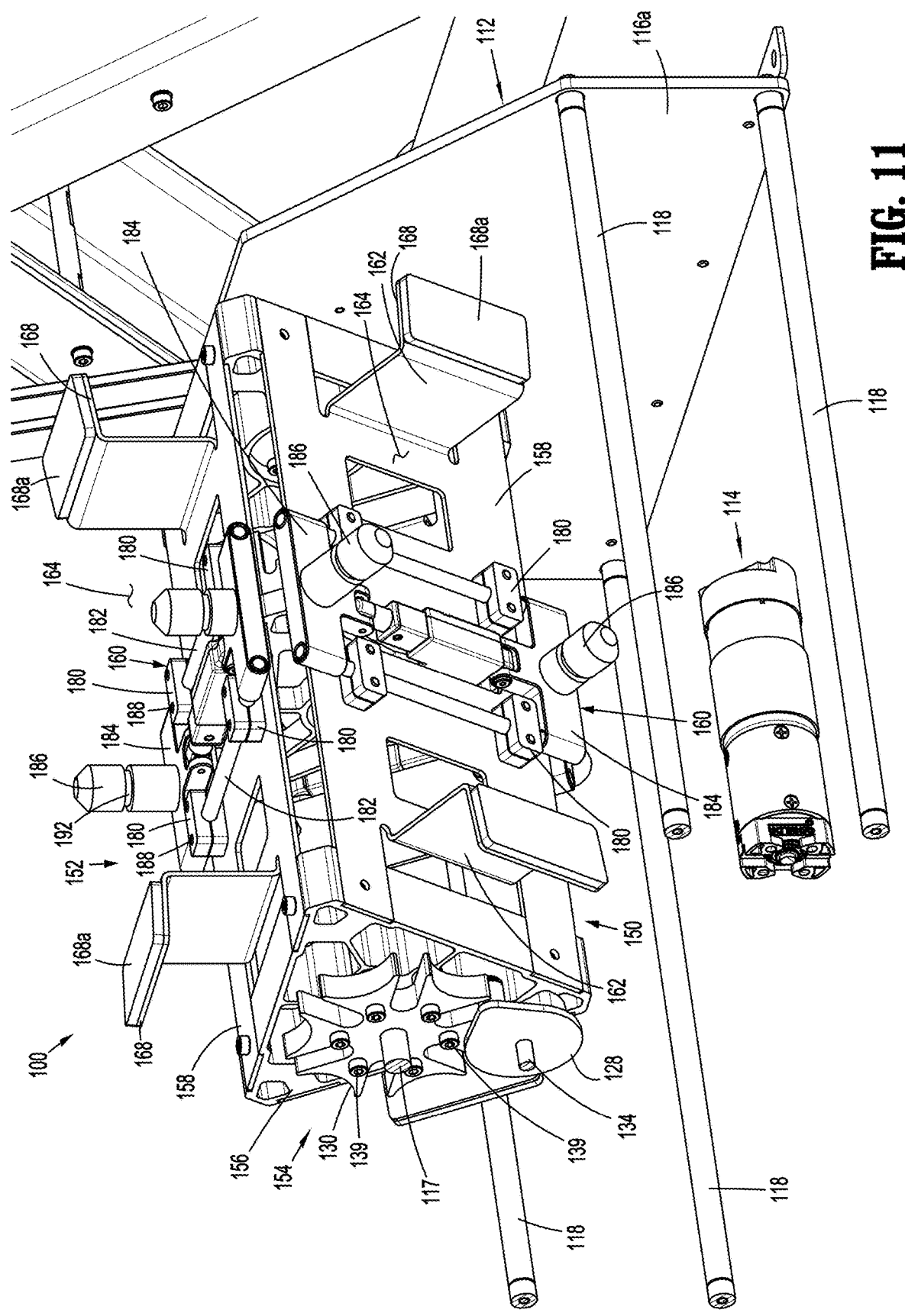
FIG. 11 is side perspective view of the battery carousel assembly shown in FIG. 10 with a mounting plate removed.
Figure 12:
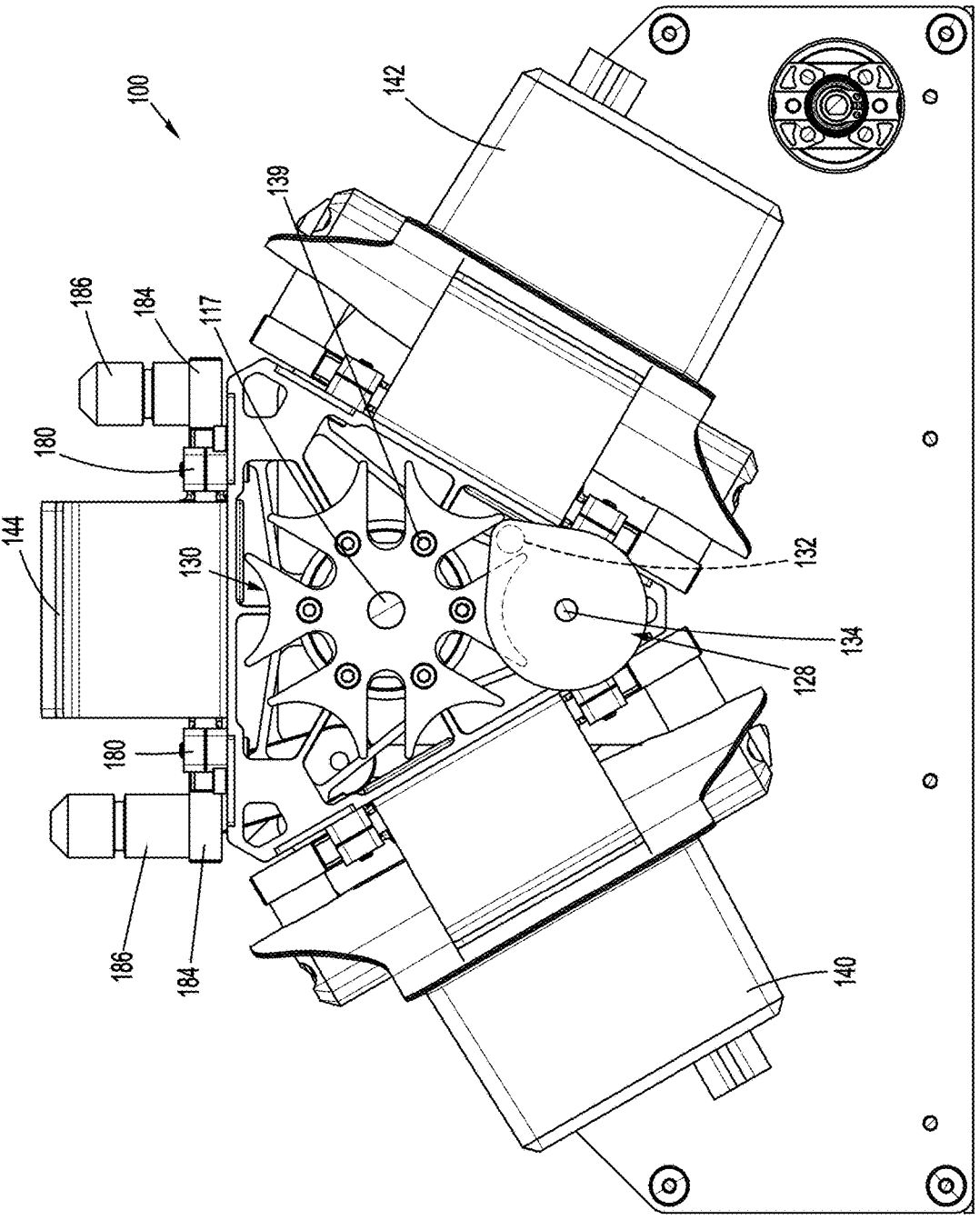
FIG. 12 is an end view of the battery carousel assembly shown in FIG. 11 with the mounting plate removed.

FIG. 11 illustrates the carousel 110 which includes three battery stations 150, 152, and 154. Although illustrated as having three battery stations, it is envisioned that the carousel 110 can have two or more stations. In the illustrated aspect of the disclosure, each of the battery stations 150, 152, and 154 are positioned about a carousel body 156 spaced 120-degrees apart. The carousel body 156 has a triangular configuration with each of the battery stations 150, 152, and 154 supported one of the sides of the carousel body 156. In aspects of the disclosure, the carousel 110 can hold three batteries 140, 142, and 144. The first battery, e.g., battery 140, will normally be in the UAV 12, the second battery, e.g., battery 142, will be on the carousel 110 charging, and the third battery, e.g., battery 144, will be fully charged and waiting for replacement into the UAV 12.

Each of the battery stations 150, 152, and 154 includes a base plate 158 and a battery retention mechanism 160. Each base plate 158 is secured to the carousel body 156 and includes two brackets 162 that extend outwardly from the base plate 158 and are spaced from each other to define a battery cavity 164. In aspects of the disclosure, each of the brackets 162 includes a bent portion 168 that extends in a direction away from the battery cavity 164 and provides a seating surface 168*a* for the UAV 12 when a battery 140 is removed from or inserted into the UAV 12. In some aspects of the disclosure, the seating surface 168*a* is padded and/or flexible to minimize impact to the UAV 12 during battery removal and replacement.

Each of the battery retention mechanisms 160 (FIG. 10) is positioned within the battery cavity 164 of one of the battery stations 150, 152, and 154 and includes brackets 180, guide rods 182, holders 184, retention pins 186, and an actuator 189. The brackets 180 are secured to the base plates 158 of the battery stations 150, 152, and 154 using, e.g., screws 188. Each of the brackets 180 defines a bore 190 that is aligned with the bore 190 of another bracket 180. The guide rods 182 extend between the two aligned brackets 180 on opposite sides of the actuator 189. In aspects of the disclosure, each of the brackets 180 includes half sections that are secured together with the screws 188 to clamp the guide rods 182 between the half sections. The guide rods 182 project beyond each end of the aligned brackets 180.

The actuator 189 is positioned between the guide rods 182 and is coupled to the holders 184. The holders 184 are supported on the ends of guide rods 182 between two of the brackets 180 and are movable along an axis parallel to an axis defined by the guide rods 182 between a release position and a locked position. In aspects of the disclosure, the holders 184 are secured to opposite sides of the actuator 189 and are movable between the release position and the locked position upon activation of the actuator 189. The retention pins 186 are secured to holders 184 and project outwardly from within the battery cavity 164. In aspects of the disclosure, each of the retention pins 186 defines an annular recess 192 and includes a tapered end 186*a* that is spaced from the holder 184. The retention pins 186 move with the holders 184 between the release position and the locked position when the actuator 189 is activated. In the locked position, a protrusion (not shown) within the battery 140, 142, or 144 is received within the annular recess 192 to secure the battery 140, 142, and 144 to the retention pins 186.

Figures 6, 7:
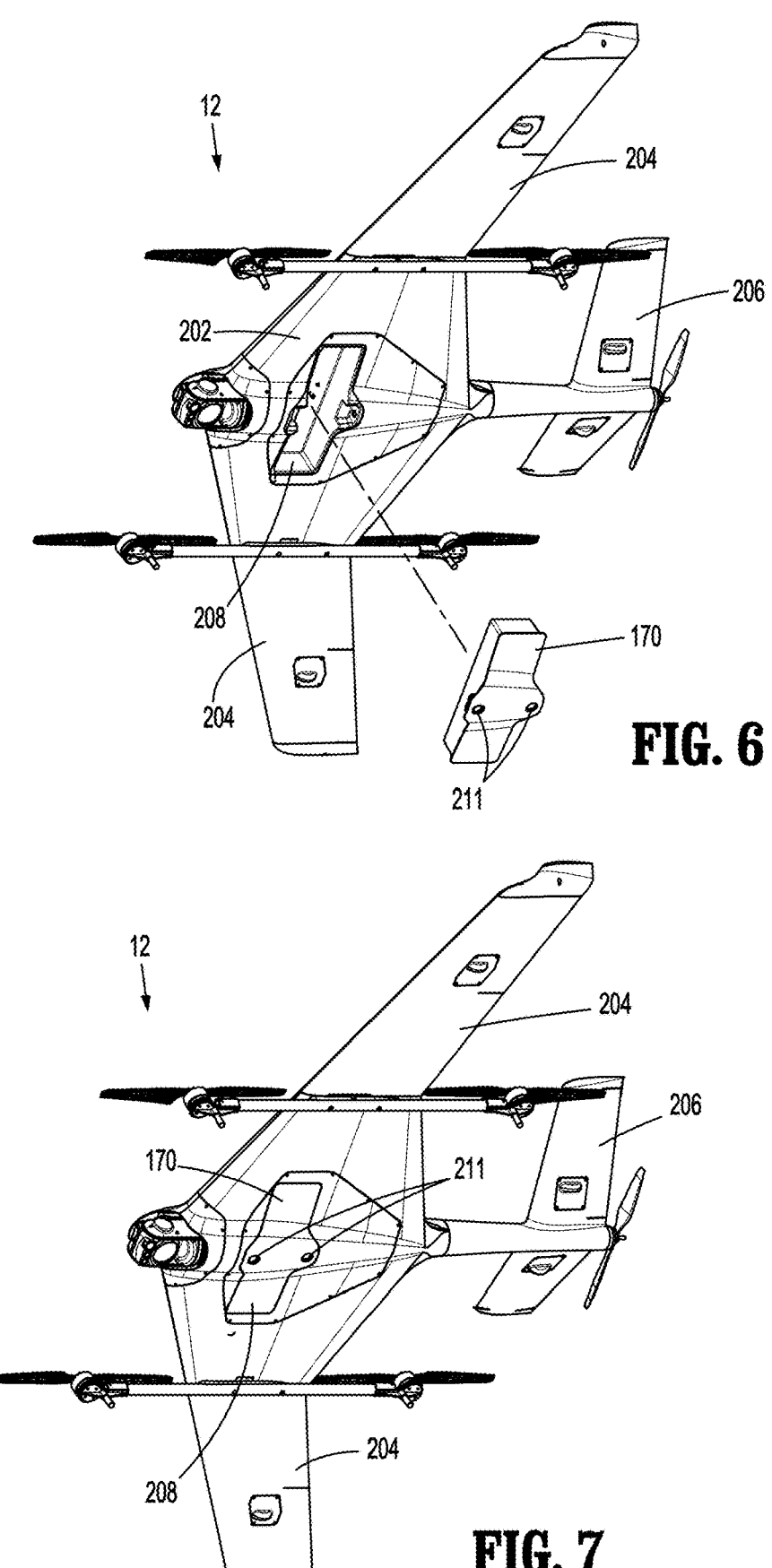
FIG. 6 is a side perspective view of the UAV shown in FIG. 2 with a battery separated from the UAV.
FIG. 7 is a side perspective view of the UAV shown in FIG. 6 with a battery separated from the UAV.
Figure 8:
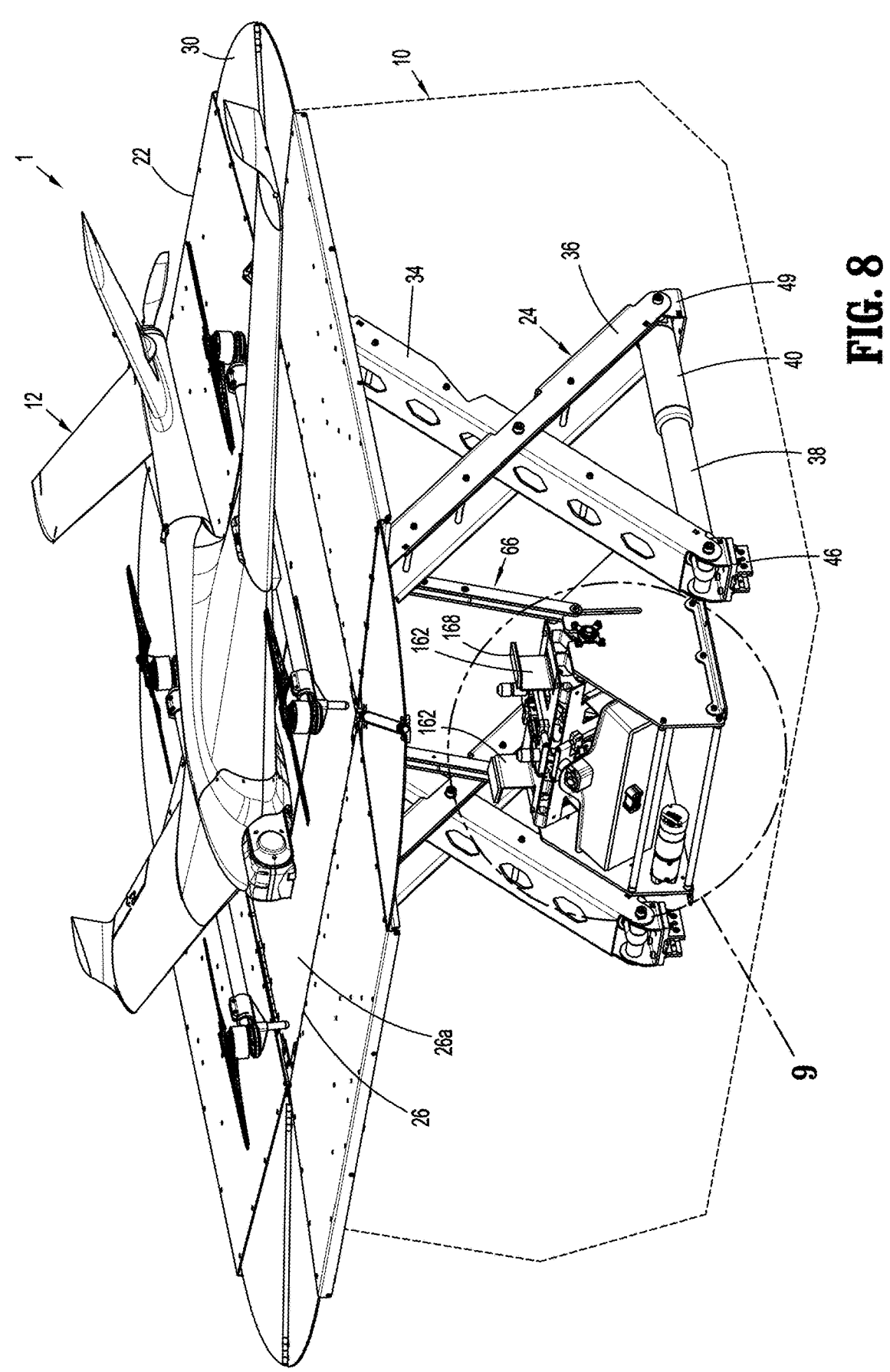
FIG. 8 is a side perspective view of the UAS with a frame and outer panels of the ground station removed and the ground station in the deployed position.
Figure 9:
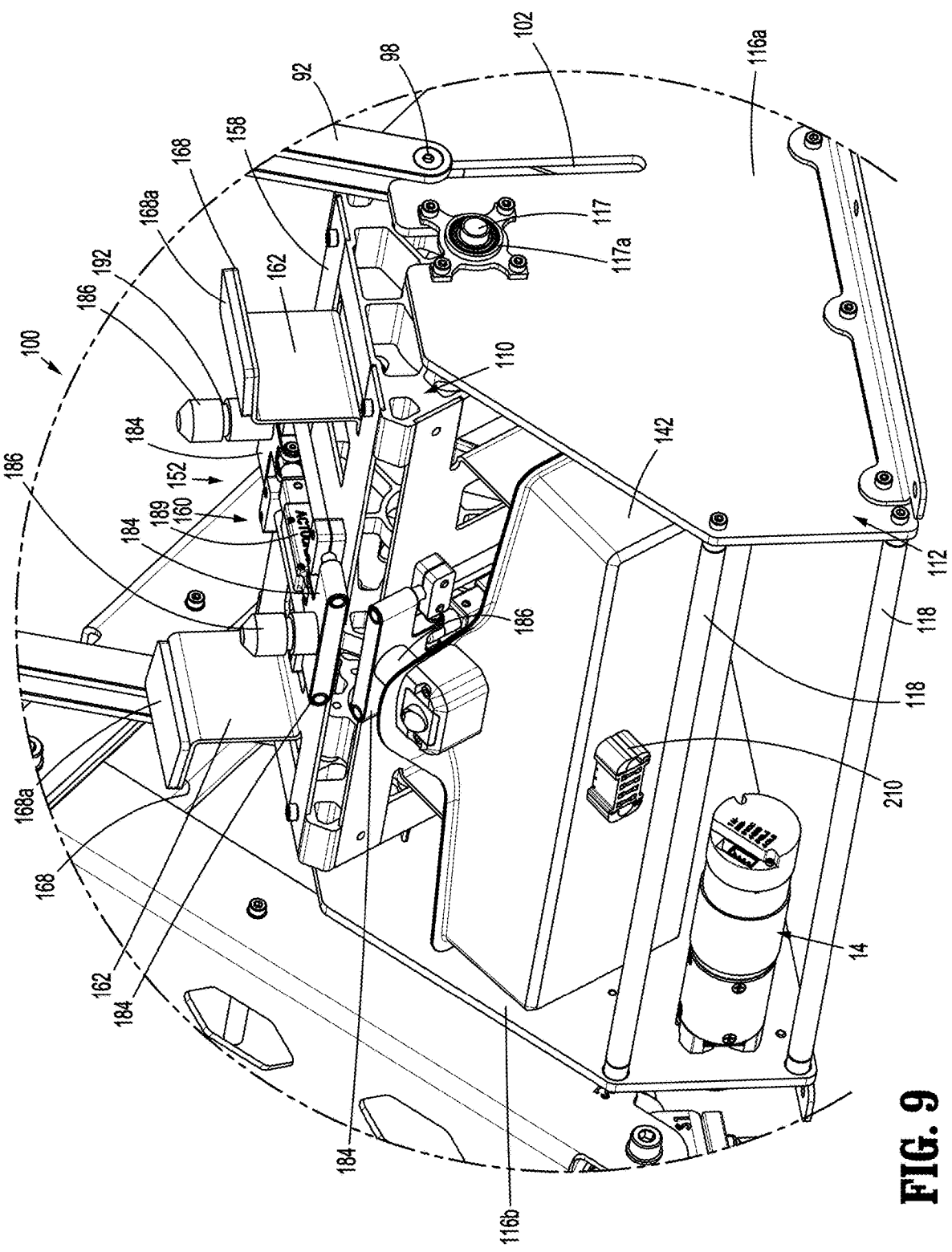
FIG. 9 is an enlarged view of the indicated area of detail shown in FIG. 8.
Figure 10:
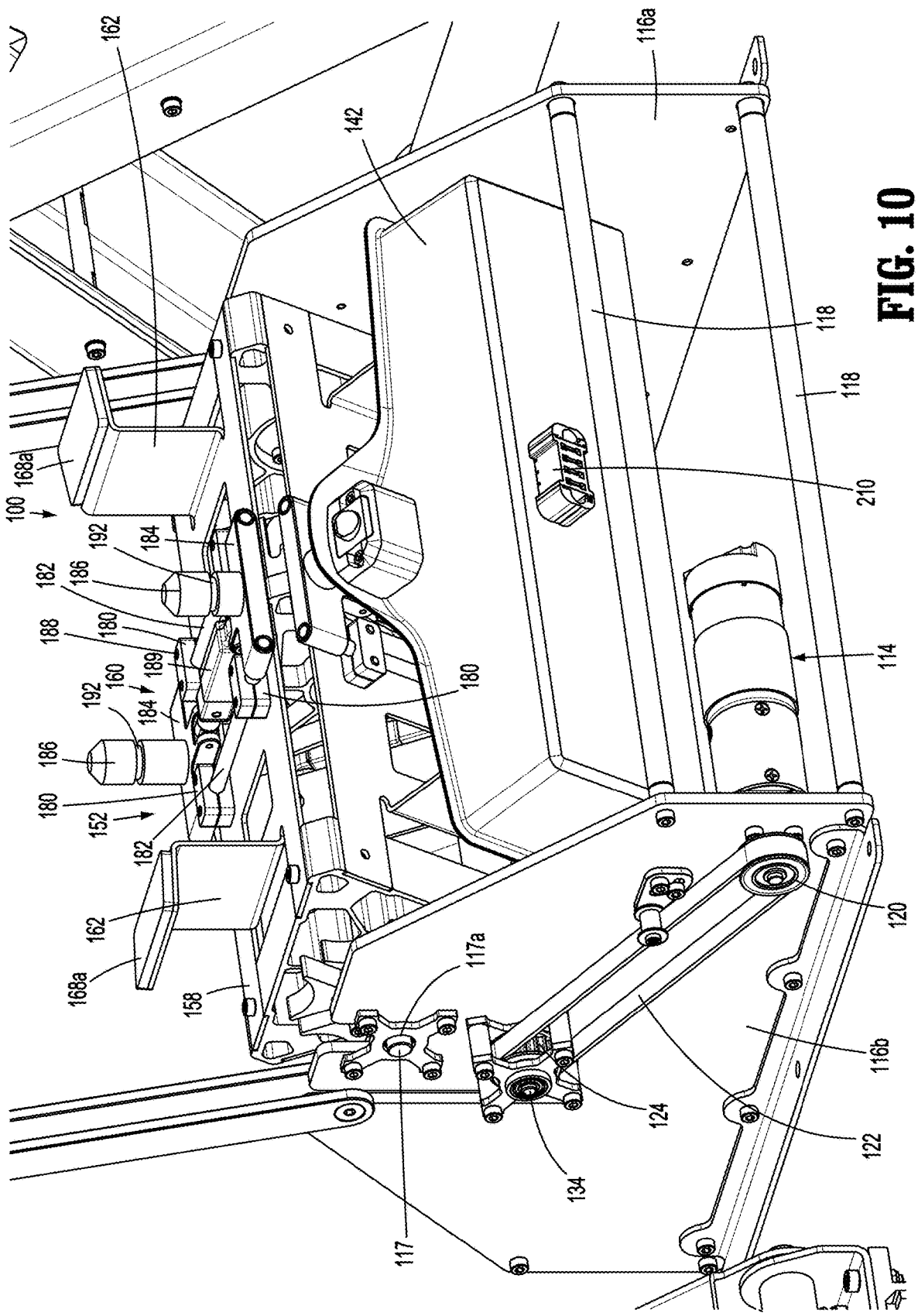
FIG. 10 is a side perspective view of a battery carousel assembly of the UAS shown in FIG. 1.

FIGS. 6 and 7 illustrate the UAV 12 which includes a fuselage 202, foldable wings 204, and a foldable tail 206. The fuselage 202 includes a lower surface that defines a battery compartment 208 that receives a battery 140. The battery 140 includes a connector 210 (FIG. 9) that extends into the battery compartment 208 and is releasably received within a receptacle 212 (FIG. 26) formed within the battery compartment 208. The battery 140 defines outer retention bores 211 that are configured to receive the retention pins 186 of one of the battery retention mechanisms 160 as described below.

FIG. 4 illustrates the ground station 10 of the UAV system 1 with the landing pad assembly 16 in the deployed position and the battery door mechanism 60 in the closed position. When the landing pad assembly 16 is in the deployed position, the guide pins 98 of the rack 66 are positioned in the upper ends of the timing slots 102, the pins 90 of the door support 64 are positioned within the angled portions 80*a* of the door cam slots 76, and the cam members 96 of the rack 66 are positioned at one end of the rack cam slots 78.

Figure 17:
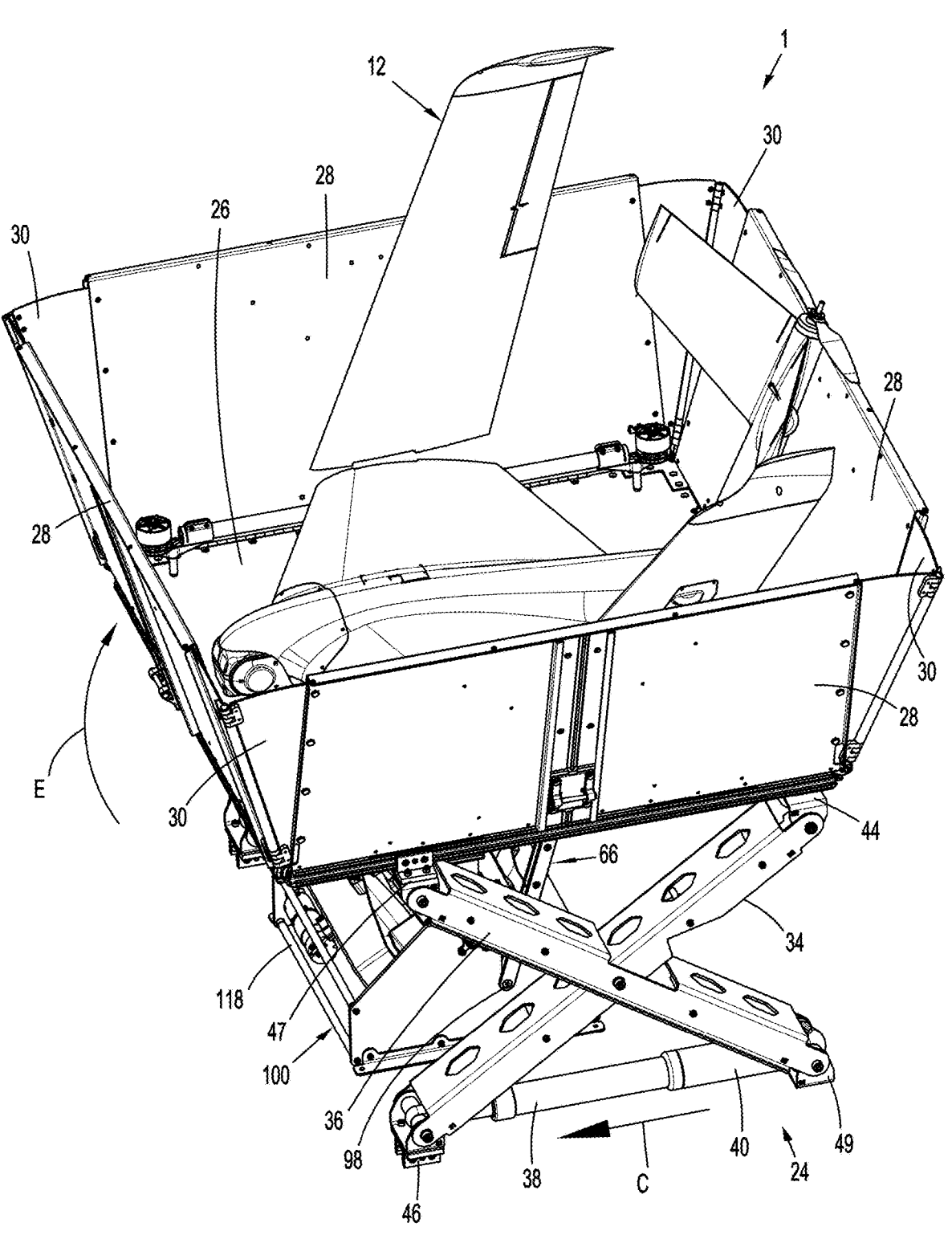
FIG. 17 is a side perspective view of the UAS shown in FIG. 1 with the frame assembly and outer panels of the ground station removed, the ground station moved from the deployed position towards the stowed position, and the battery door in a closed position.
Figure 18:
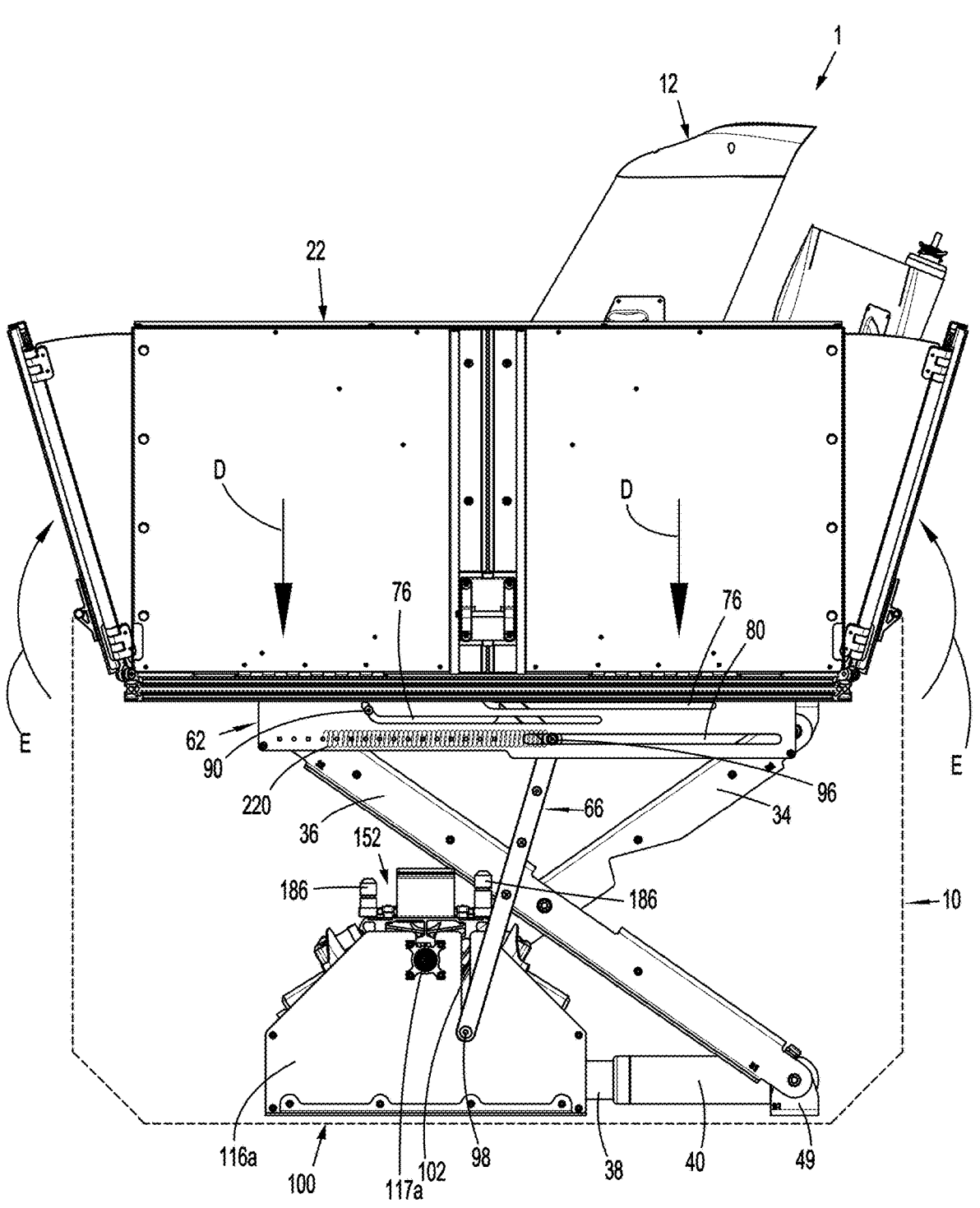
FIG. 18 is a side view of the UAS shown in FIG. 17 with the frame assembly and outer panels of the ground station removed, the ground station moved from the deployed position towards the stowed position, and the battery door in a closed position.
Figure 19:
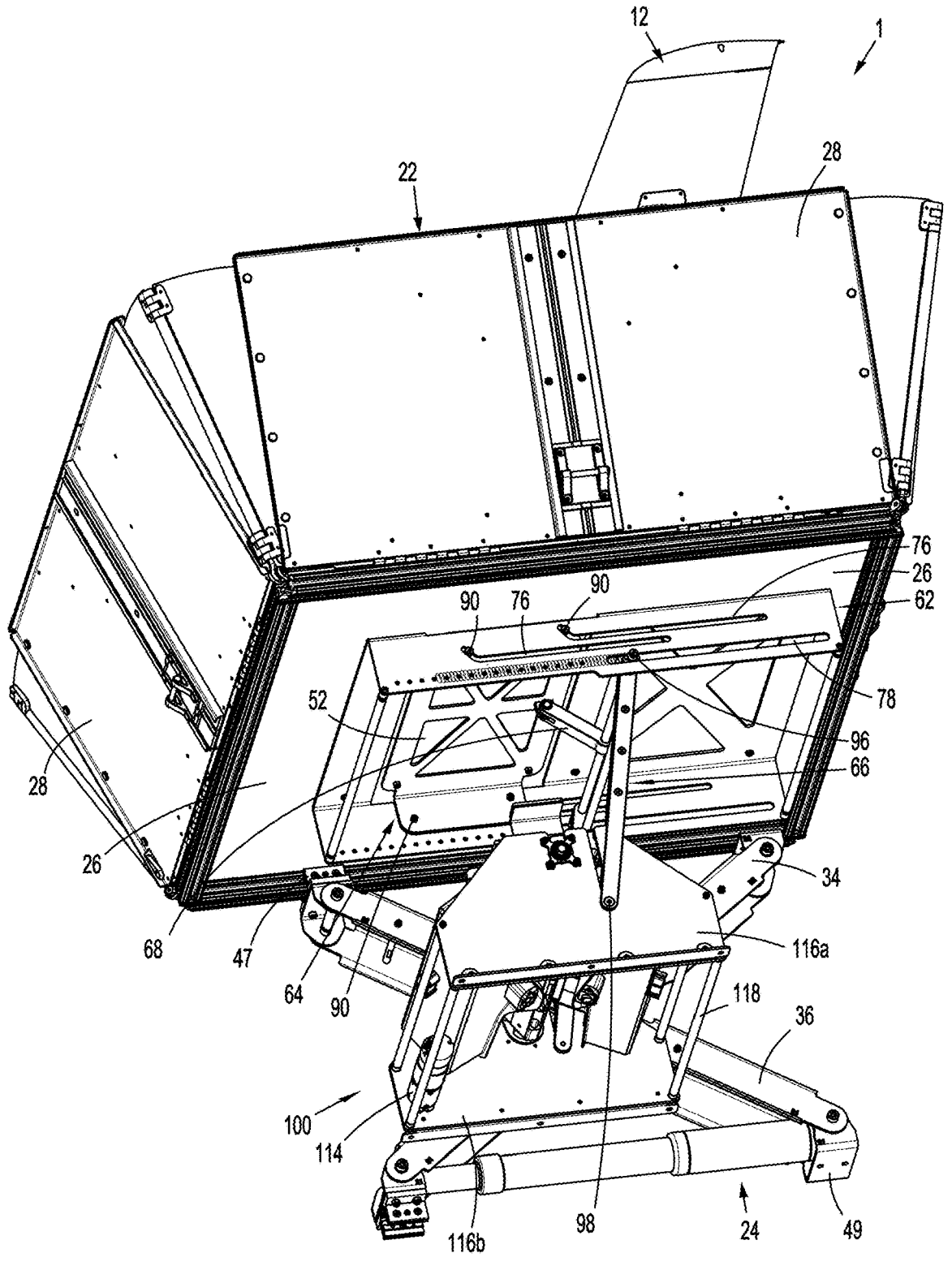
FIG. 19 is a bottom perspective view of the UAS shown in FIG. 18 with the frame assembly and outer panels of the ground station removed, the ground station moved from the deployed position towards the stowed position, and the battery door in a closed position.

FIGS. 17-19 illustrate the system 1 as the landing pad assembly 16 initially moves from the deployed position towards the stowed position to center the UAV 12 on the landing pad 22 of the landing pad assembly 16. When the actuator assembly 24 is activated to move the driver 38 in the direction of arrow "C" in FIG. 17, the first and second arm members 34 and 36 of the actuator assembly 24 begin to collapse to lower the landing pad 22 into the frame 18 (FIG. 3) in the direction of arrows "D" in FIG. 18. As the side pads 28 of the landing pad 22 engage the frame 18 of the ground station 10, the side pads 28 pivot upwardly in the direction indicated by arrows "E" in FIG. 17 into engagement with the UAV 12 to center the UAV 12 on the center pad 26 of the landing pad 22. As the center pad 26 moves downwardly in the direction of arrows "D", the rack 66 which is supported on the landing pad support 62 by the cam members 96 moves downwardly with the landing pad 22 to move the guide pins 98 supported on the lower end of the rack 66 downwardly towards the lower ends of the timing slots 102 formed in the end plates 116*a* and 116*b* of the battery carousel assembly 100. In this position, the rack 66 has not pivoted from its initial position and the battery door 52 remains in the closed position.

Figure 20:
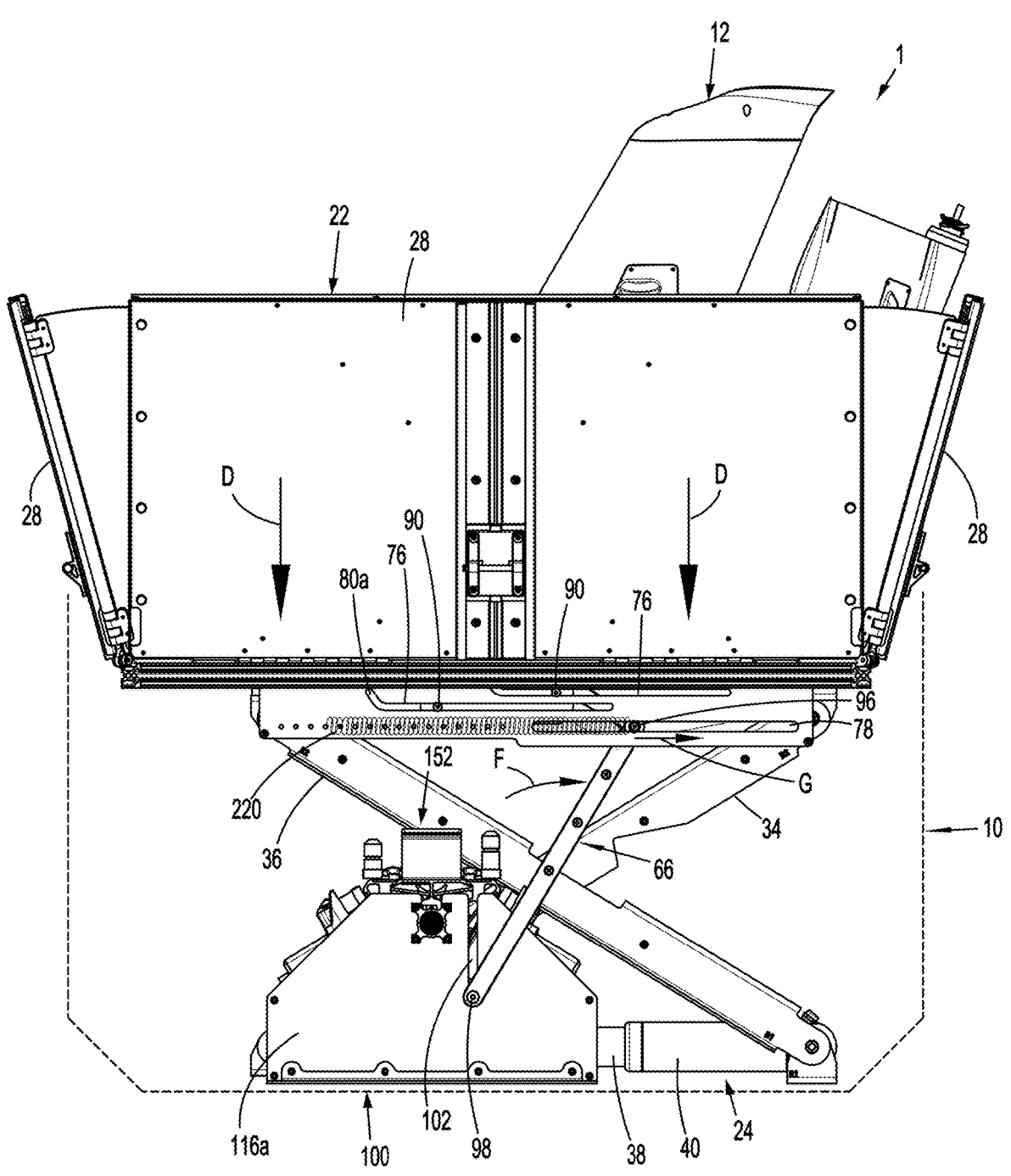
FIG. 20 is a side view of the UAS shown in FIG. 19 with the frame assembly and outer panels of the ground station removed, the ground station moved further towards the stowed position, and the battery door in a partially open position.
Figure 21:
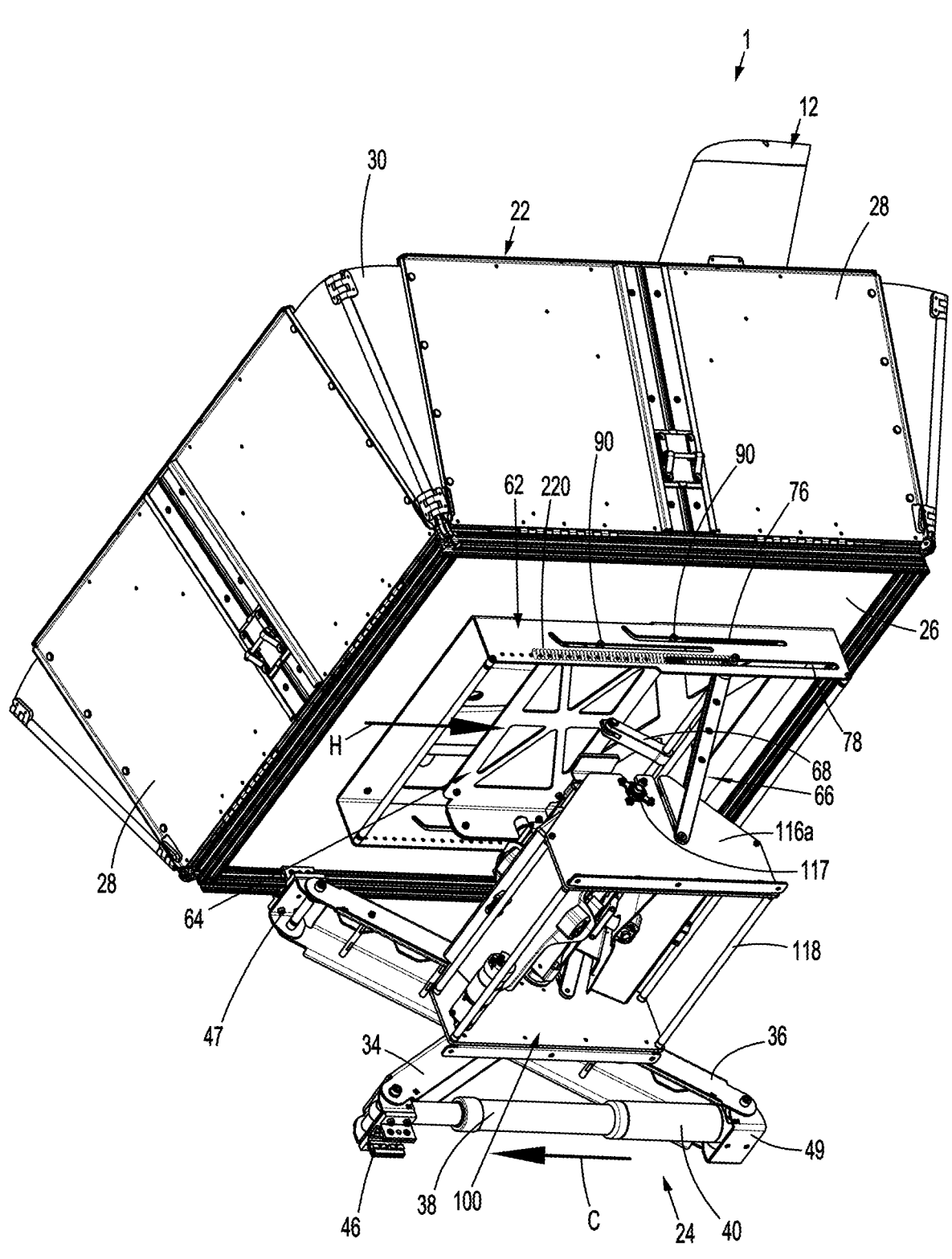
FIG. 21 is a bottom perspective view of the UAS shown in FIG. 20 with the frame assembly and outer panels of the ground station removed, the ground station moved further towards the stowed position, and the battery door in a partially open position.

FIGS. 20 and 21 illustrate the system 1 as the landing pad assembly 16 moves further towards the stowed position and the battery door 52 begins to open. When the actuator assembly 24 advances the driver 38 further in the direction of arrow "C" in FIG. 21, the first and second arm members 34 and 36 of the actuator assembly 24 collapse further to lower the landing pad 22 into the frame 18 (FIG. 3) of the ground station 10 in the direction of arrows "D" in FIG. 20. When the guide pins 98 on the lower ends of the rack 66 reach the bottom of the timing slot 102, downward movement of the rack 66 is stopped and the rack 66 begins to pivot in the direction of arrow F in FIG. 20 to move the cam members 96 in the direction of arrow "G" in FIG. 20. The door support 64 supports the battery door 52 and is coupled to the cross beam 94 of the rack 66 by the battery door link 68. As the rack 66 pivots in the direction of arrow "F", the door support 64 and the battery door 52 are pulled in the direction of arrow "H" in FIG. 21 to move the battery door 52 in relation to the landing pad 22 towards the open position.

As described above, the pins 90 of then door support 64 are fixedly coupled to the door support 64 and are received within the door cam slots 76 of the landing pad support 62. As the door support 64 moves in relation to the landing pad support 62, the pins 90 initially move downwardly through the angled portions 80a of the door cam slots 76. This allows the battery door 52 to move downwardly below the landing pad 22 before moving horizontally to a position beneath the landing pad 22.

In aspects of the disclosure, springs 220 can be attached between the landing pad support 62 and the cam members 96 to urge the battery door towards the closed position. The springs 220 can be coil springs that are in tension to urge the battery door 52 towards the closed position. It is envisioned that other types of biasing members in different configurations can be used to urge the battery door 52 towards the closed position.

Figure 22:
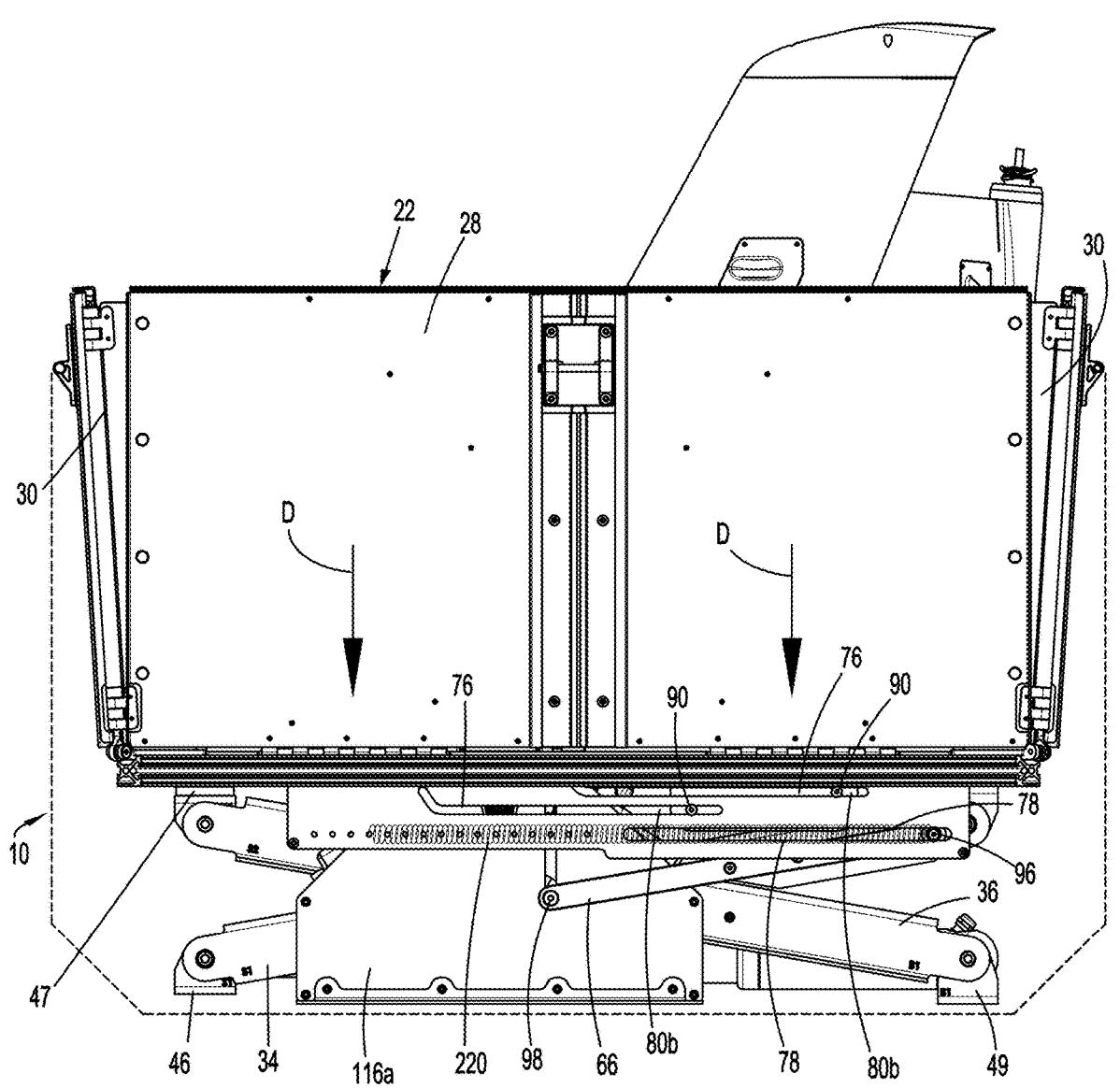
FIG. 22 is a side view of the UAS shown in FIG. 21 with the frame assembly and outer panels of the ground station removed, the ground station moved further towards the stowed position, and the battery door in an open position with a spent battery engaged with the battery carousel.
Figure 23:
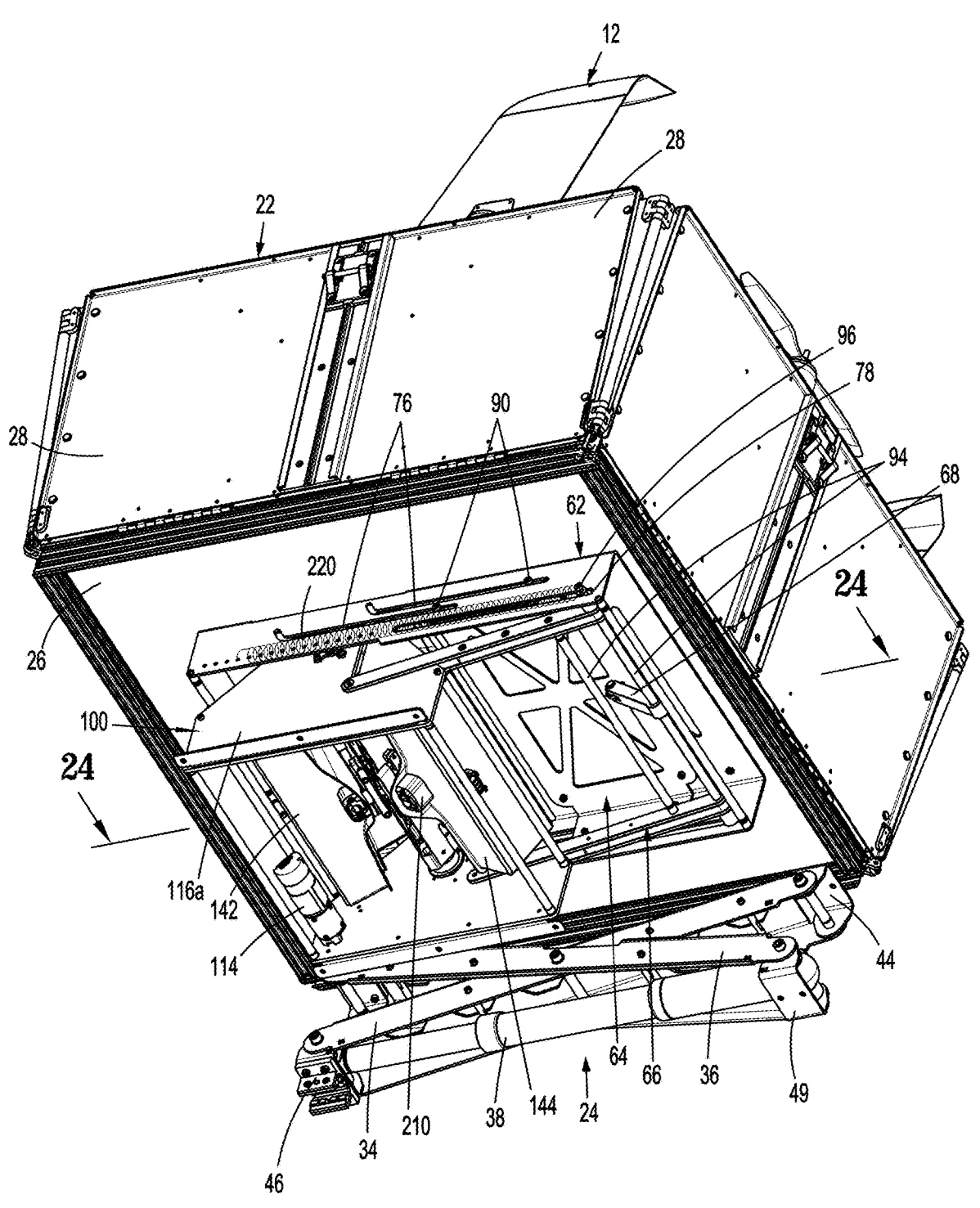
FIG. 23 is a bottom perspective view of the UAS shown in FIG. 22 with the frame assembly and outer panels of the ground station removed, the ground station moved further towards the stowed position, and the battery door in the open position with the spent battery engaged with the battery carousel.
Figure 24:
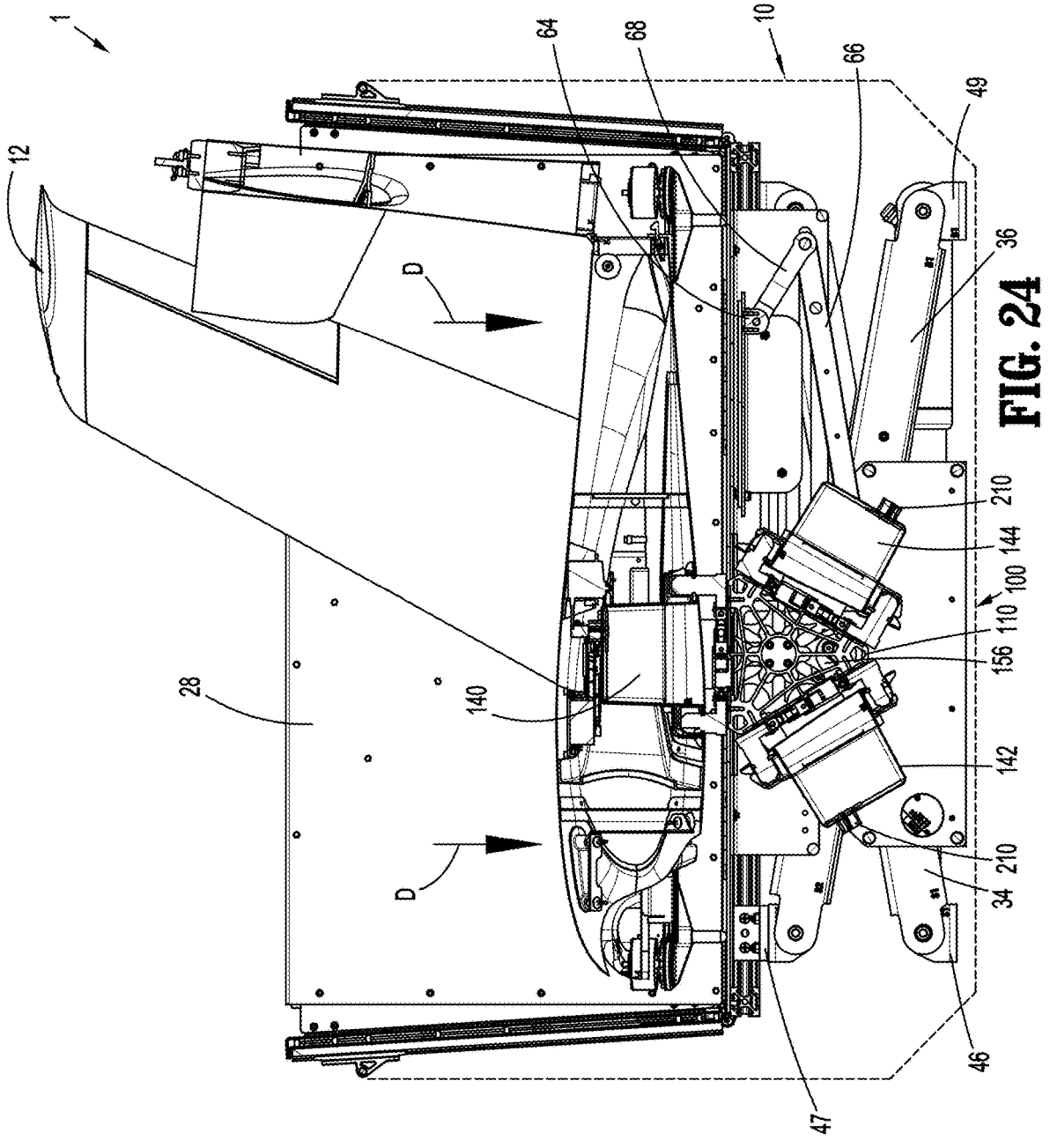
FIG. 24 is a side cross-sectional view of the UAS shown in FIG. 23 taken along section line 24-24 of FIG. 23.

FIGS. 22-24 illustrate the system 1 in the stowed position and the battery door 52 fully open with the battery 140 of the UAV 12 received within one of the battery stations 150, 152, or 154. When the landing pad 22 moves to the stowed position, the battery door 52 automatically moves to the open position with the pins 90 of the door support 64 positioned adjacent the end of the horizontal portion 80b of the door cam slots 76 and the cam members 96 on the upper portion of the rack 66 positioned in the end of the rack cam slots 78. As the landing pad 22 moves to the stowed position, the retention pins 186 of the battery station 150, 152, or 154 aligned with the window 50 in the center pad 26 of the landing pad 22 pass through the window 50 and are received within the retention bores 211 of the battery 140 of the UAV 12.

When the retention pins 186 are received within the retention bores 211 of the battery 140, the actuator 189 of the retention mechanism 160 can be activated to move the retention pins 186 of the retention mechanism 160 to the locked position to secure the battery 140 to the retention mechanism 160.

Figure 25:
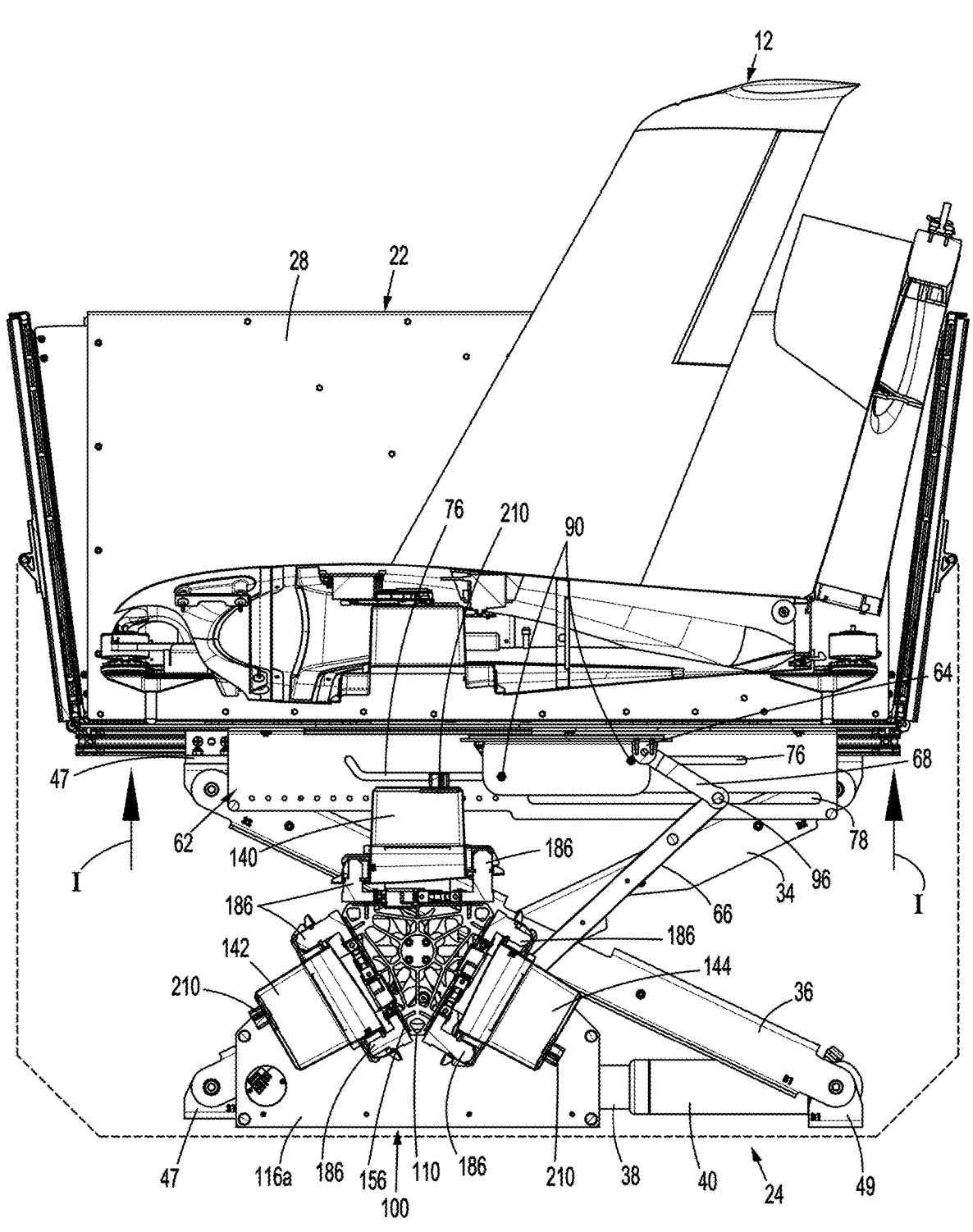
FIG. 25 is a side view of the UAS shown in FIG. 23 with the frame assembly and outer panels of the ground station removed, and the ground station moved back towards the deployed position to disengage the spent battery from the UAV.

As illustrated in FIG. 25, after the battery 140 is secured to the retention mechanism 160, the landing pad 22 can be moved back towards the deployed position in the direction of arrows "I" to disengage the battery 140 from the UAV 12. This is accomplished by activating the motor 40 to retract the drive member 38 and extend the first and second arm members 34 and 36 of the actuator assembly 24 to lift the UAV 12 away from the battery carousel 100. Since the battery 140 is secured to the retention mechanism 60, the battery 140 will disengage from the UAV 12 and remain in the battery station 150, 152, or 154 of the battery carousel 100.

Figure 26:
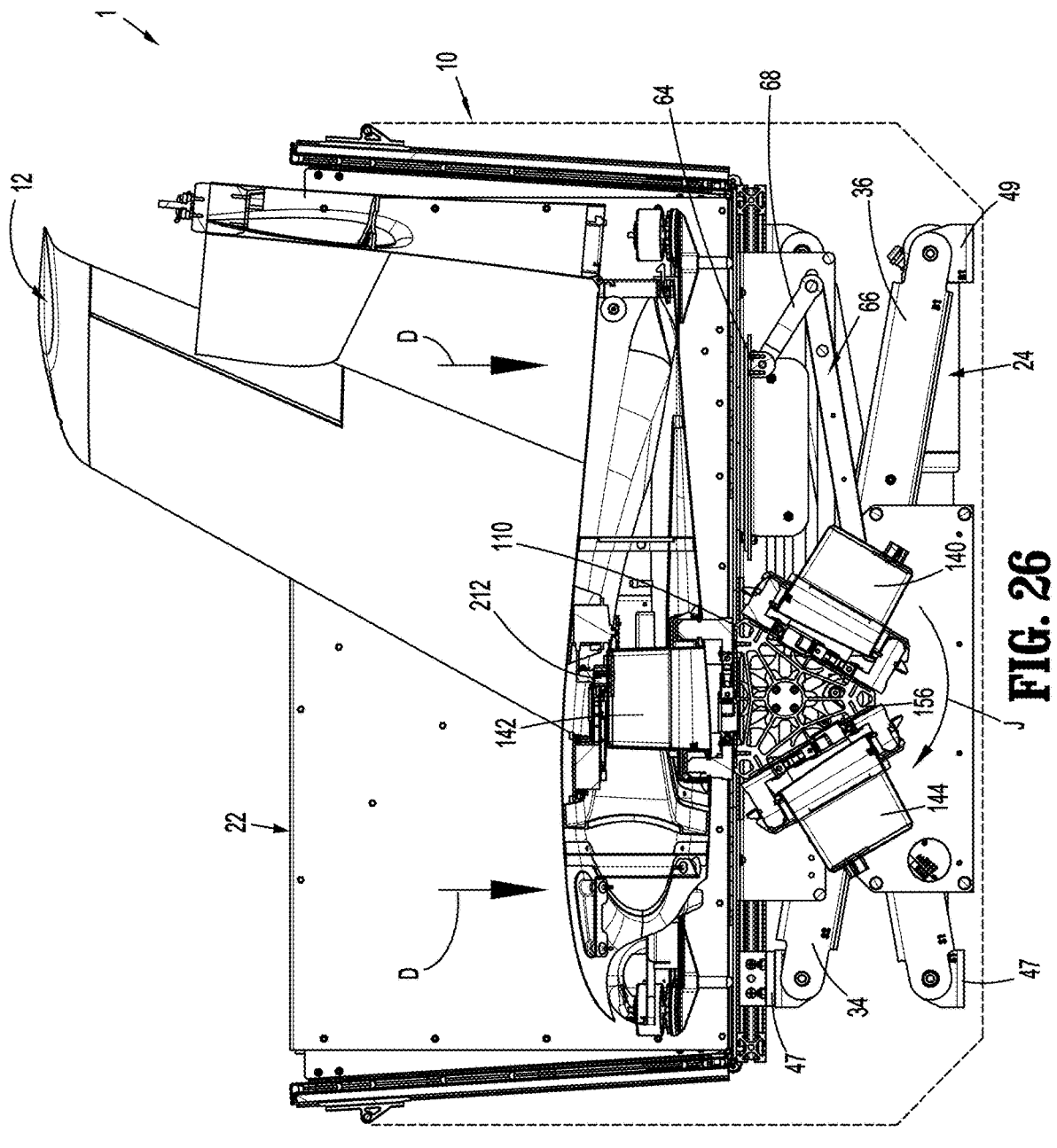
FIG. 26 is a side view of the UAS shown in FIG. 24 with the frame assembly and outer panels of the ground station removed, and the ground station moved back towards the stowed position to position a charged battery into the UAS.

FIG. 26 illustrates the placement of a charged battery 142 into the UAV 12. After the battery 140 is removed from the UAV 12, the battery carousel 100 can be operated to rotate the battery carousel 100 over an arc of 120 degrees in the direction of arrow "J" as described above to position a charged battery 142 beneath the window 50 of the landing pad 22. Once the charged battery 142 is positioned beneath the window 50 of the landing pad 22, the landing pad 22 can be moved back to the stowed position in the direction of arrows "D" to insert the battery 142 into the battery compartment 208 of the UAV 12 and position the connector 210 of the battery 142 into the receptacle 212 of the UAV 12 to couple the battery 142 to the UAV 12.

The battery door assembly 60 of the ground station 10 provides for timed movement of the battery door 52 via a linkage assembly to facilitate communication between the UAV 12 and the battery carousel assembly 100 to allow for removal and replacement of a UAV battery in response to the mechanical movement of a landing pad 22 of the ground station 10. The battery door assembly 60 obviates any need for additional drive units to operate the battery door 52 and any control technology for coordinating movement of the battery door 52 with that of the landing pad assembly 16.

The disclosed UAS allows for replacement of a battery of the UAV while the battery remains stationary. Once the battery carousel assembly 100 moves to a position in which a battery is located beneath the window 50 of the landing pad 22 (battery placement), or a position in which an empty battery station (battery removal) is located beneath the window 50 of the landing pad 22, the battery (or the battery station) remains stationary and only the landing pad 22 and the UAV 12 move in relation to the battery carousel to effect battery replacement or removal.

The battery door mechanism 60 is not necessary to obtain benefits and advantages achieved by the disclosed system 1 described above. It is envisioned that the battery door 52 can be moved between the open and closed positions by other mechanisms and devices. For example, the system 1 can include a variety of different types of motors, actuators, servos, or the like to move the battery door between the open and closed positions to facilitate battery placement or battery removal. In such a system, the battery door 52 can be moved to the open position before or during movement of the landing pad 22 from the deployed position to the stowed position. Once the battery door 52 is opened, movement of the landing pad 22 towards the stowed position allows for automatic battery removal and placement as described above.

Further aspects of the present disclosure are provided by the subject matter of the following clauses.

A ground station for an unmanned aerial system (UAS) comprising:

a landing pad assembly and a battery door mechanism. The landing pad assembly includes a landing pad and an actuator assembly. The landing pad defines a window, and the actuator assembly is coupled to the landing pad and actuable to move the landing pad between a deployed position and a stowed position. The battery door mechanism includes a battery door and a linkage assembly coupling the battery door to the landing pad. The linkage assembly is coupled to the landing pad and to the battery door, wherein movement of the landing pad from the deployed position to the stowed position moves the battery door from a closed position to an open position.

The ground station according to any of the preceding clauses, wherein the linkage assembly includes a landing pad support that is secured to the landing pad and defines an opening that is aligned with the window, and a door support that is movably supported on the landing pad support, the battery door being secured to the door support.

The ground station according to any of the preceding clauses, wherein the landing pad support defines door cam slots, and the door support includes cam members that are received within the door cam slots of the landing pad support, and the cam members being movable through the door cam slots as the battery door moves between the closed position and the open position.

The ground station according to any of the preceding clauses, wherein the landing pad support defines two door cam slots on a first side of the landing pad support and two door cam slots on a second side of the landing pad support, and the door support includes two cam members on a first side of the door support and two cam members on a second side of the door support.

The ground station according to any of the preceding clauses, wherein each of the door cam slots includes an angled portion that communicates with a horizontal portion, and the cam members are received in the angled portion when the battery door is in the closed position.

The ground station according to any of the preceding clauses, wherein the linkage assembly further includes a rack and a battery door link, the rack having an upper portion that supports rack cam members.

The ground station according to any of the preceding clauses, wherein the landing pad support defines rack cam slots that receive the rack cam members, the rack cam members movable through the rack cam slots as the landing pad moves between the deployed position and the stowed position to pivot the rack.

The ground station according to any of the preceding clauses, wherein the battery door link includes a first portion pivotably coupled to the rack and a second portion pivotably coupled to the door support.

The ground station according to any of the preceding clauses, wherein the rack has a lower end that supports at least one guide pin, and the ground station further includes at least one timing slot, the at least one guide pin received within the at least one timing slot.

The ground station according to any of the preceding clauses, wherein the at least one timing slot is substantially vertical and allows the rack to have an initial downward movement with the landing pad without pivoting as the landing pad moves from the deployed position towards the stowed position.

The ground station according to any of the preceding clauses, wherein the timing slot is configured to prevent downward movement of the rack after the initial downward movement such that further downward movement of the landing pad towards the stowed position causes the rack to pivot about an axis defined by the at least one guide pin.

The ground station according to any of the preceding clauses, wherein pivotable movement of the rack causes the rack cam members to move from first ends of the rack cam slots towards second ends of the rack cam slots.

The ground station according to any of the preceding clauses, further including a spring positioned to urge the first cam member towards the first end of the rack cam slot.

The ground station according to any of the preceding clauses, further including a battery carousel positioned beneath the window of the landing pad, the battery carousel including a plurality of battery stations, each of the plurality of battery stations including a retention mechanism for securing a battery to the plurality of battery stations and for releasing the battery from the plurality of battery stations.

The ground station according to any of the preceding clauses, wherein the battery carousel includes a carousel body and a carousel motor, the carousel motor coupled to the carousel body to rotate the carousel body to selectively position one of the plurality of battery stations beneath the window of the landing pad.

A ground station for an unmanned aerial vehicle (UAS) comprising: a landing pad assembly and a battery door mechanism. The landing pad assembly includes a landing pad and an actuator assembly. The actuator assembly is coupled to the landing pad and actuable to move the landing pad between a deployed position and a stowed position. The landing pad defines a window. The battery door mechanism includes a battery door, a landing pad support, a door support, and a rack. The battery door is secured to door support, and the landing pad support is secured to the landing pad. The door support is movably supported on the landing pad support between a first position in which the battery door is received within the window and a second position in which the battery door uncovers the window. The rack has a first portion coupled to the landing pad support and a second portion coupled to the door support such that movement of the landing pad from the deployed position to the stowed position moves the battery door from the first position to the second position.

The ground station according to any of the preceding clauses, further including a battery carousel positioned beneath the window of the landing pad, the battery carousel including a plurality of battery stations, each of the plurality of battery stations including a retention mechanism for securing a battery to the plurality of battery stations and for releasing the battery from the plurality of battery stations.

The ground station according to any of the preceding clauses, wherein the battery carousel includes a carousel body and a carousel motor, the carousel motor coupled to the carousel body to rotate the carousel body to selectively position one of the plurality of battery stations beneath the window of the landing pad.

The ground station according to any of the preceding clauses, wherein the battery door mechanism includes a battery door link having a first end coupled to the door support and a second end coupled to the rack.

A UAS comprising: a UAV and a ground station. The UAV including a battery defining retention bores. The ground station includes a landing pad assembly and a battery door mechanism. The landing pad assembly includes a landing pad and an actuator assembly. The landing pad defining a window, and the actuator assembly is coupled to the landing pad and actuable to move the landing pad between a deployed position and a stowed position. The battery door mechanism including a battery door and a linkage assembly coupling the battery door to the landing pad, the linkage assembly coupled to the landing pad and to the battery door, wherein movement of the landing pad from the deployed position to the stowed position moves the battery door from a closed position to an open position; and a battery carousel positioned beneath the window of the landing pad, the battery carousel including a plurality of battery stations, each of the plurality of battery stations including a retention mechanism for securing a battery to the station and for releasing the battery from the station, the retention mechanism including retention pins, the retention pins extending through the window into the retention bores when the UAV is positioned on the landing pad and the UAV is in the stowed position, wherein the retention pins are movable between a release position and a locked position to selectively secure a battery to or release a battery from the battery carousel.

A UAS comprising: a UAV and a ground station. The UAV including a battery defining retention bores. The ground station includes a landing pad assembly, a battery door, and a battery carousel. The landing pad assembly has a landing pad and an actuator assembly. The landing pad defines a window, and the actuator assembly is coupled to the landing pad and actuable to move the landing pad between a deployed position and a stowed position. The battery door is movable between a closed position and an open position to open and close the window. The battery carousel is positioned beneath the window of the landing pad and includes a plurality of battery stations. Each of the plurality of battery stations has a retention mechanism for securing a battery to the battery station and for releasing the battery from the battery station. Movement of the landing pad from the deployed position to the stowed position moves the battery of the UAV into one of the plurality of battery stations to facilitate removal of the battery from the UAV.

The UAS according to any of the preceding clauses, wherein the retention mechanism includes retention pins that are received within the retention bores of the battery to secure the battery to the battery carousel when the landing pad is moved to the stowed position.

The UAS according to any of the preceding clauses, wherein the retention pins are movable between a locked position and a release position, and in the locked position, the battery is secured to the battery carousel.

Persons skilled in the art will understand that the structures and methods specifically described herein and illustrated in the accompanying figures are non-limiting exemplary aspects, and that the description, disclosure, and figures should be construed merely as exemplary of particular aspects. It is to be understood, therefore, that this disclosure is not limited to the precise aspects described, and that various other changes and modifications may be effectuated by one skilled in the art without departing from the scope or spirit of the disclosure. Additionally, it is envisioned that the elements and features illustrated or described in connection with one exemplary aspect may be combined with the elements and features of another without departing from the scope of this disclosure, and that such modifications and variations are also intended to be included within the scope of this disclosure. Indeed, any combination of any of the disclosed elements and features is within the scope of this disclosure. Accordingly, the subject matter of this disclosure is not to be limited by what has been particularly shown and described.

What is claimed is:

1. A ground station for an unmanned aerial system (UAS) comprising:

a landing pad assembly including a landing pad and an actuator assembly, the landing pad defining a window, the actuator assembly coupled to the landing pad and actuable to move the landing pad between a deployed position and a stowed position; and a battery door mechanism including a battery door and a linkage assembly coupling the battery door to the landing pad, the linkage assembly coupled to the landing pad and to the battery door, wherein movement of the landing pad from the deployed position to the stowed position moves the battery door from a closed position to an open position;

wherein the linkage assembly includes a landing pad support that is secured to the landing pad and defines an opening that is aligned with the window, and a door support that is movably supported on the landing pad support, the battery door secured to the door support.

2. The ground station of claim 1, wherein the landing pad support defines door cam slots, and the door support includes cam members that are received within the door cam slots of the landing pad support, the cam members movable through the door cam slots as the battery door moves between the closed position and the open position.

3. The ground station of claim 2, wherein the door cam slots include two door cam slots on a first side of the landing pad support and two door cam slots on a second side of the landing pad support, and the cam members includes two cam members on a first side of the door support and two cam members on a second side of the door support.

4. The ground station of claim 3, wherein each of the door cam slots includes an angled portion that communicates with a horizontal portion, and the cam members are received in the angled portion when the battery door is in the closed position.

5. The ground station of claim 2, wherein the linkage assembly further includes a rack and a battery door link, the rack having an upper portion that supports rack cam members.

6. The ground station of claim 5, wherein the landing pad support defines rack cam slots that receive the rack cam members, the rack cam members movable through the rack cam slots as the landing pad moves between the deployed position and the stowed position to pivot the rack.

7. The ground station of claim 6, wherein the battery door link includes a first portion pivotably coupled to the rack and a second portion pivotably coupled to the door support.

8. The ground station of claim 7, wherein the rack has a lower end that supports at least one guide pin, and the ground station further includes at least one timing slot, the at least one guide pin received within the at least one timing slot.

9. The ground station of claim 8, wherein the at least one timing slot is substantially vertical and allows the rack to have an initial downward movement with the landing pad without pivoting as the landing pad moves from the deployed position towards the stowed position.

10. The ground station of claim 9, wherein the timing slot is configured to prevent downward movement of the rack after the initial downward movement such that further downward movement of the landing pad towards the stowed position causes the rack to pivot about an axis defined by the at least one guide pin.

11. The ground station of claim 10, wherein pivotable movement of the rack causes the rack cam members to move from first ends of the rack cam slots towards second ends of the rack cam slots.

12. The ground station of claim 11, further including a spring positioned to urge the first cam member towards the first end of the rack cam slot.

13. The ground station of claim 1, further including a battery carousel positioned beneath the window of the landing pad, the battery carousel including a plurality of battery stations, each of the battery stations including a retention mechanism for securing a battery to the station and for releasing the battery from the station.

14. The ground station of claim 13, wherein the battery carousel includes a carousel body and a carousel motor, the carousel motor coupled to the carousel body to rotate the carousel body to selectively position one of the plurality of battery stations beneath the window of the landing pad.

15. A UAS comprising:

a UAV configured to receive a battery; and a ground station including:

a landing pad assembly including a landing pad and an actuator assembly, the landing pad defining a window, the actuator assembly coupled to the landing pad and actuable to move the landing pad between a deployed position and a stowed position, a battery door movable between a closed position and an open position to open and close the window; and a battery carousel positioned beneath the window of the landing pad and including a plurality of battery stations, each of the plurality of battery stations having a retention mechanism for securing the battery to the battery station and for releasing the battery from the battery station, wherein movement of the landing pad from the deployed position to the stowed position moves the battery of the UAV into one of the plurality of battery stations to facilitate removal of the battery from the UAV.

16. The UAS of claim 15, wherein the retention mechanism includes retention pins and the battery defines retention bores, the retention pins received within the retention bores of the battery to secure the battery to the battery carousel as the landing pad is moved to the stowed position.

17. The UAS of claim 16, wherein the retention pins are movable between a locked position and a release position, and in the locked position, the battery is secured to the battery carousel.

18. A ground station for an unmanned aerial vehicle system (UAS) comprising:

a landing pad assembly including a landing pad and an actuator assembly, the actuator assembly coupled to the landing pad and actuable to move the landing pad between a deployed position and a stowed position, the landing pad defining a window; and a battery door mechanism including a battery door, a landing pad support, a door support, and a rack, the battery door secured to door support, the landing pad support secured to the landing pad and the door support movably supported on the landing pad support between a first position in which the battery door is received within the window and a second position in which the battery door uncovers the window, the rack having a first portion coupled to the landing pad support and a second portion coupled to the door support such that movement of the landing pad from the deployed position towards the stowed position moves the battery door from the first position towards the second position.

19. The ground station of claim 18, further including a battery carousel positioned beneath the window of the landing pad, the battery carousel including a plurality of battery stations, each of the plurality of battery stations including a retention mechanism for securing a battery to the station and for releasing the battery from the station.

* * * * *